United States Patent [19]
Dunkin

[11] 3,765,037
[45] Oct. 16, 1973

[54] APPARATUS FOR TRANSFERRING OBJECTS

[75] Inventor: Albert Dunkin, South Norwalk, Conn.

[73] Assignee: Diamondhead Corporation, Mountainside, N.J.

[22] Filed: Apr. 5, 1972

[21] Appl. No.: 241,111

[52] U.S. Cl. ............................ 5/81 R, 5/86, 198/202
[51] Int. Cl. ............................ A61g 1/02, F16h 7/18
[58] Field of Search ........................... 5/81 R, 81 B; 198/202, 203; 193/35 R; 226/21, 22; 74/241

[56] References Cited
UNITED STATES PATENTS

| 3,281,146 | 10/1966 | Bridge | 271/68 |
| 3,312,335 | 4/1967 | Paris et al. | 198/202 |
| 3,368,665 | 2/1968 | Jinkins | 198/202 |
| 3,435,693 | 4/1969 | Wright et al. | 198/202 X |
| 3,579,672 | 5/1971 | Koll et al. | 5/81 R |

Primary Examiner—Casmir A. Nunberg
Attorney—Joseph M. Lane et al.

[57] ABSTRACT

An improved belt drive and control mechanism for an object transfer apparatus of the type in which different phases of transfer operation are effected by selective linear travel in transfer apron forming flight portions of an endless belt. The flight length of a loop formation in the apron forming endless belt is varied concurrently with alternate energization of primary and secondary belt brakes to achieve the desired flight travel in the transfer apron. Also an automatic belt tracking arrangement is included in the mechanism.

39 Claims, 33 Drawing Figures

Patented Oct. 16, 1973

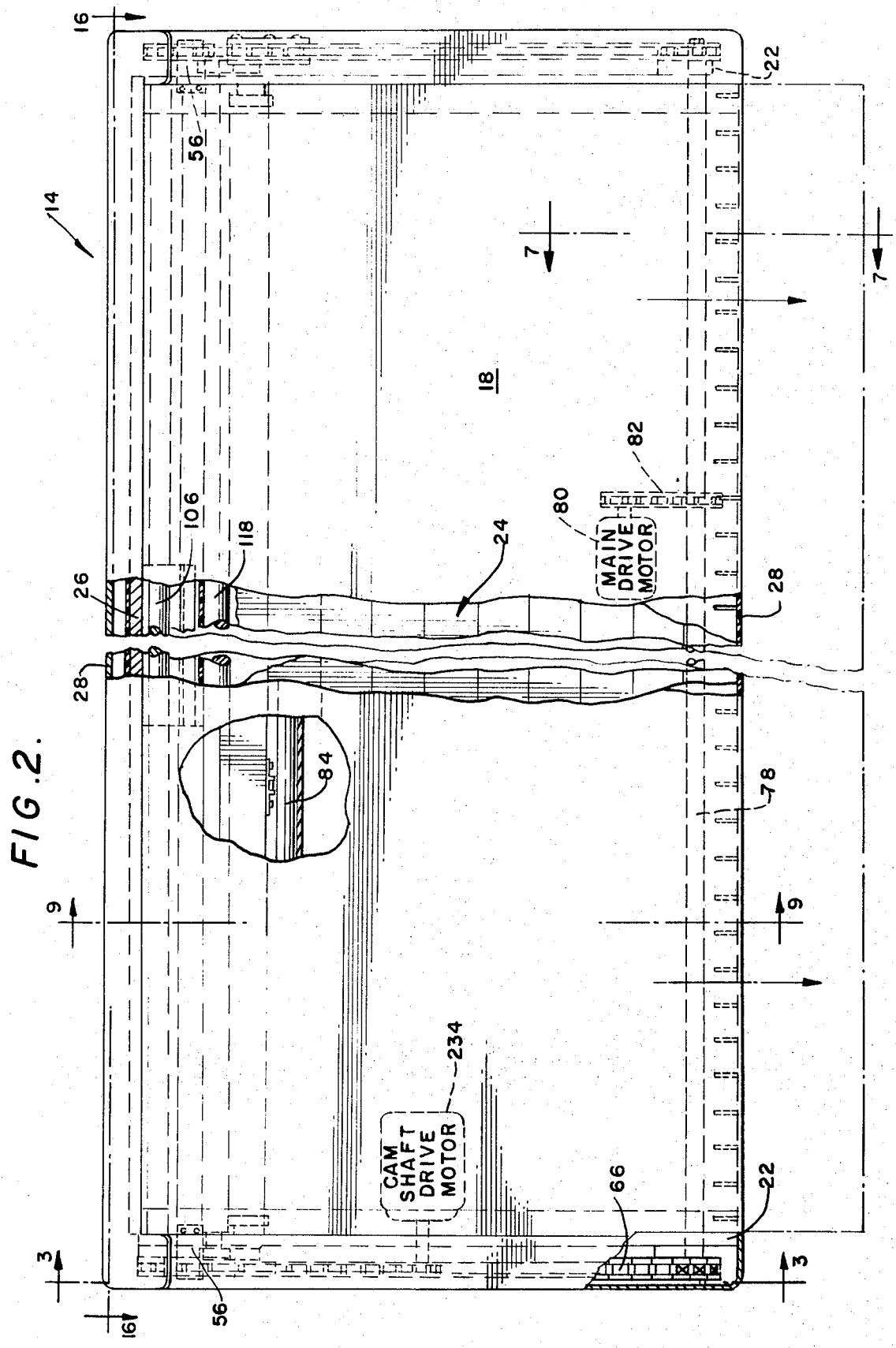

Patented Oct. 16, 1973

Patented Oct. 16, 1973

Patented Oct. 16, 1973  3,765,037

Patented Oct. 16, 1973

Patented Oct. 16, 1973 3,765,037
11 Sheets-Sheet 9
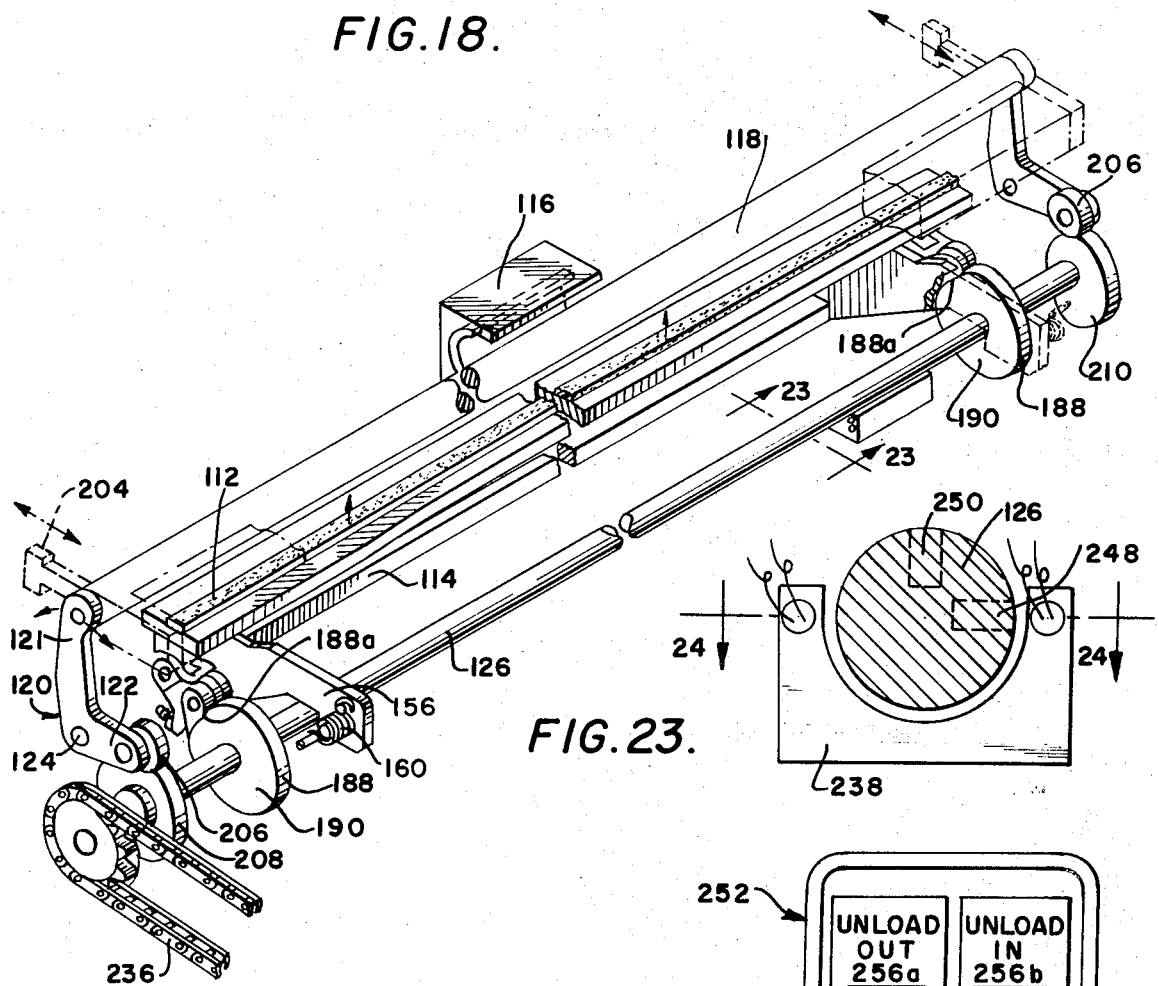
FIG. 18.
FIG. 23.
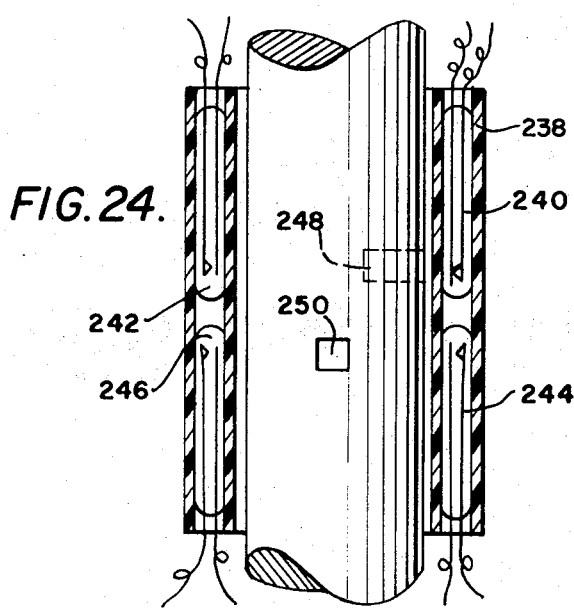
FIG. 24.
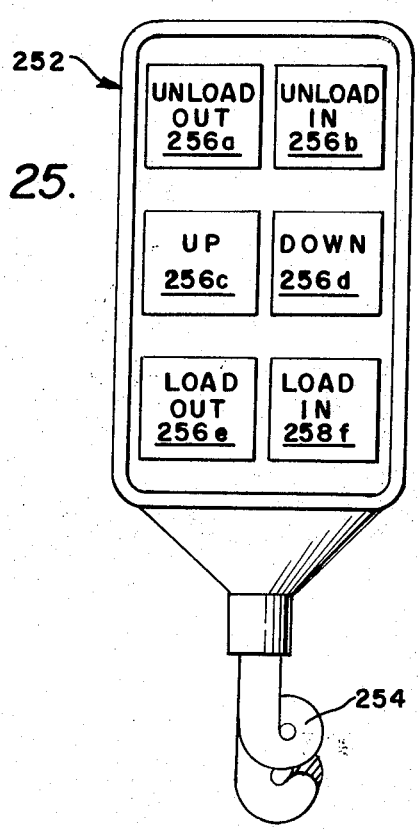
FIG. 25.

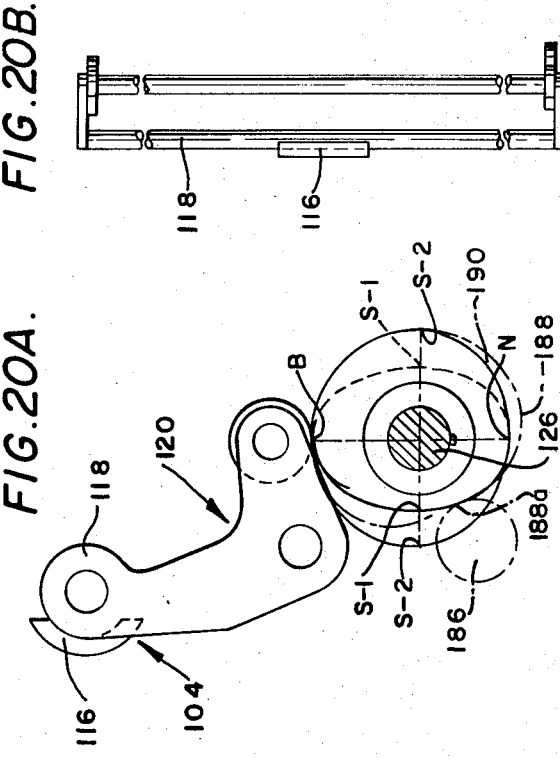
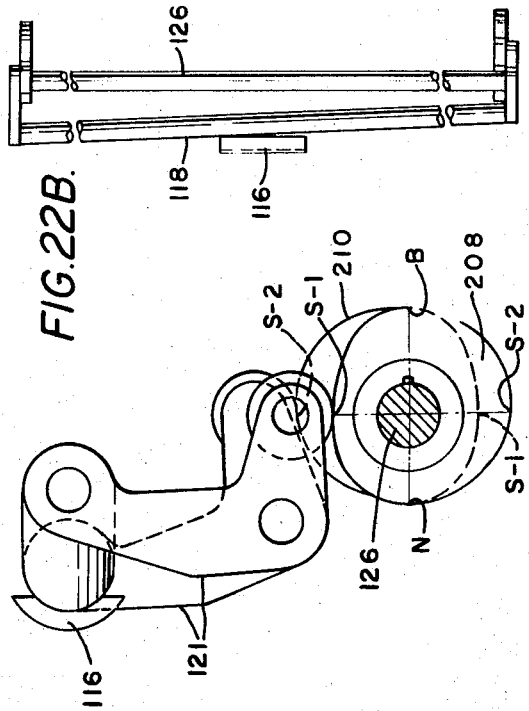
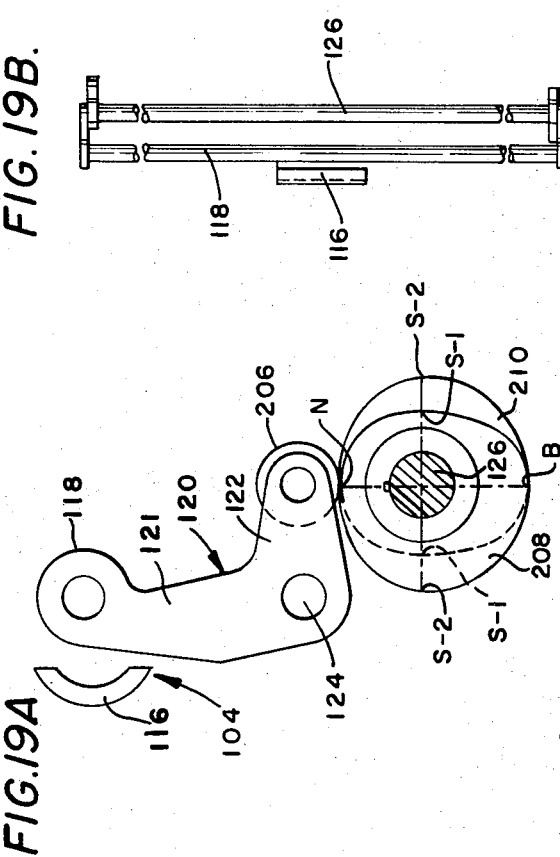
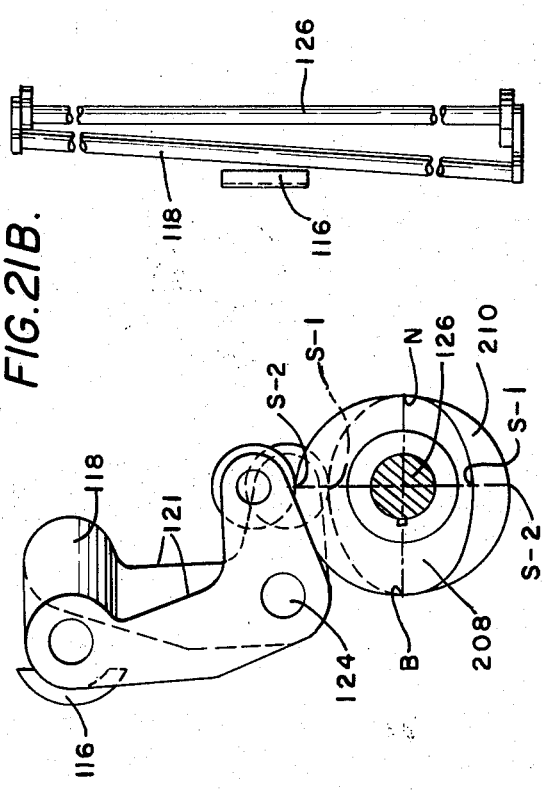

3,765,037

APPARATUS FOR TRANSFERRING OBJECTS

BACKGROUND OF THE INVENTION

This invention relates to improvements in apparatus for transferring objects, and more particularly, it concerns an improved apron drive and control arrangement for object moving apparatus of the type illustrated and described in U.S. Pat. No. 3,579,672 issued on May 25, 1971 to Laurel A. Koll and Walter Crook, Jr. and assigned to the assignee of the present invention.

The object moving apparatus disclosed in the aforementioned U.S. Pat. No. 3,579,672 has been demonstrated to be a most highly effective tool for use in transferring non-ambulatory patients from a hospital bed or other surface on which they are initially reclined to a mobile carriage by which they may be supported and then transferred to a second surface such as a surgical table, an x-ray table or another bed. In essence, the apparatus of the patent includes, in addition to a load carrying mobile base structure, a pair of laterally translatable superposed, sheet-like apron supporting separator members about which a pair of upper and lower fabric-like aprons are trained. The aprons are established by endless belts formed of fiberglass or nylon reinforced teflon and are independently controlled in a manner such that during lateral extension of the separators out over a bed and under a patient to be transferred, the respective flight portions of the upper and lower aprons which contact the patient and the bed remain stationary relative thereto and thus isolate both the patient and the bed from frictional contact with the laterally extending separator plates. When the patient is fully positioned on the assembly of aprons and separator plates, the condition of the upper apron is changed so that the upper flight portion thereof, in physical contact with the patient, will move in the same direction and at the same linear speed as the separator plates during retraction to transfer the patient from the bed or other surface on which he was initially reclined to the apparatus. The lower flight portion of the lower apron is fixed to the base structure of the apparatus so that it remains stationary with respect to the surface of the bed also during the retraction of the separator plates. Thus, during loaded retraction of the separator and apron assembly, the lower flight portion of the upper apron slides relative to the upper flight portion of the lower apron with which it is in frictional contact. Such sliding motion between the belts is accommodated by the low friction characteristics of the reinforced teflon from which they are made and the generation of unwanted static electricity is avoided by impregnating one or both of the belts holding the aprons with a conductive material such as graphite.

Although the use of fabric-like coverings or aprons to isolate an object from frictional contact with a supporting member advanced laterally under the object was known prior to the effective date of the aforementioned U.S. patent, the basic apparatus disclosed in that patent possesses several unique features which are believed to be the basis for its immediate acceptance in the patient transfer field. Foremost of these features is the universal flexibility of the apron and separator assembly by which this assembly may conform to the irreular and unpredictable contour of the human anatomy reclined on a yieldable surface such as a bed mattress. This feature, combined with the facility for retaining to one-half inch or less the thickness of the plate-like transfer assembly which moves under the object or patient to be transferred, enables a combined "softness" and "thinness" which makes it difficult for a bedridden patient to feel the assembly moving beneath him, not to mention a total absence of discomfort. Secondly, the provision for changing the condition of the upper apron relative to its separator plate not only enables the lateral loaded retraction of the assembly of aprons and plates to effect the transfer of the object or patient back to the apparatus, but does so without in any way lifting the object or patient from the surface on which he is initially reclined and with which a patient identifies emotionally. This feature is enhanced further by the inclusion of a storage loop in the endless belt establishing the upper apron so that the upper apron defines a continuous surface extending from beneath the patient to the remote side of the apparatus to which the patient is transferred. As a result, the transfer of a hospital patient can be effected without subjecting the patient to any measure of fear or other emotional disturbance normally associated with patient handling operations.

While the apparatus disclosed in the aforementioned U.S. patent therefore represents, in terms of basic operating principles, a major breakthrough particularly in the handling or transfer of non-ambulatory hospital patients, working experience with the apparatus has demonstrated a need for improvement in the belt control and drive mechanism of the apparatus. In the prior apparatus, for example, a storage loop formation in th belt establishing the upper apron was formed by training flight portions of that belt about the top and bottom surfaces of the lower apron or belt. To offset the frictional drag between the surfaces of the flight portions during certain cycles of operation, the load carrying structure of the apparatus was established by parallel rollers extending longitudinally of the machine or in the direction of the belt width. Not only did these rollers add to the weight and the expense of the machine, but also and perhaps more significantly, they imposed undesirable lines of concentrated stress on the apron and separator assemblies. Also in the prior apparatus, control of the upper belt was effected by training a flight potion thereof between rotatable pinch rollers. Because of the low friction characteristics of material from which the belt is formed coupled with the length of roller required to accommodate the width or transverse dimension of the apron forming the endless belt in terms of its direction of travel (approximately six feet) a measure of slippage would occur between the drive roller and the belt thereby detracting from the efficiency of operation.

Another problem experienced with the apparatus for which the improvements of this invention are primarily intended was as a result of improper tracking of the endless belt establishing the upper apron. Though edge guiding the endless belt was provided initially to overcome the problem of the belt creeping endwise of the machine, the stress is imposed on edges of the belt was found with extended operation to cause an unacceptable amount of belt wear and breakage.

While the background of experience gained with working embodiments of the apparatus disclosed in the aforementioned patent demonstrates the desirability and the need for improvement, the recognition and discussion of those problems is not intended in any way as a criticism of the highly desirable basic operating principles of that apparatus.

SUMMARY OF THE PRESENT INVENTION

In accordance with the present invention, an improved apron drive and control mechanism for object transferring apparatus of the aforementioned type is effected by training an endless belt establishing the upper of two superposed aprons about relatively stationary and movable rollers to form a storage loop formation capable of flight length variation so that full control over movement of non-movement of selected flight portions of the belt can be achieved by regulating the on or off condition of primary and secondary belt retaining brakes. As in the apparatus of the prior art, the lower one of the two aprons is established by a belt trained about the top and bottom of a supporting separator plate and having its lower flight portion fixed to the deck of the apparatus. In accordance with the present invention, however, the deck is formed by a continuous horizontal surface in direct and continuous supporting contact with the lower apron and the loop formation in the upper apron forming belt is located entirely below the deck. As a result, the two aprons are in surface contact with each other over an area only as large as the separator plates about which they are respectively trained.

The movable rollers in part forming the loop formation in the upper apron establishing endless belt are mounted on carriages supported by end plates in the apparatus frame structure. The carriages, in turn, are driven by drive chains which also drive the separator plates between respective retracted and extended positions, thereby to provide a direct mechanical synchronization of the carriages with the apron supporting separators.

The primary belt brake, also referred to as a "main brake" regulates linear flight movement of the upper apron and operates when actuated or closed against the belt to hold the upper flight of the upper apron in a fixed or stationary condition. As the name implies, the main brake is capable of a relatively large braking or clamping force and is operative during those phases of overall operation when maximum tensile forces are imposed on the belt establishing the upper apron. The secondary belt brake, referred to also as a "roll brake" because of its structural organization, is energized or closed against the belt only when the main brake is deenergized or open. When closed, the roll brake ensures a proper take-up of slack as well as movement of the upper apron as a unit with the upper apron supporting separator. Structurally, the roll brake is established by mounting the relatively stationary roller of the roller forming the belt storage loop formation for a slight measure of adjustable movement with respect to a fixed brake shoe. Hence, roll brake energization is effected by a clamping movement of the roller against the fixed shoe. In addition, the braking roller is capable of an angular adjustment from a neutral or nonbraking position to effect tracking steerage of the belt during certain phases of machine operation. Adjustment of the braking roller for both braking and steering functions is carried out by a single cam shaft operated by a single electrical motor controlled automatically by system of limit switches and control circuitry.

Among the objects of the present invention, therefore, are: the provision of an improved object transferring apparatus of the type referred to; the provision of an improved apron drive and control mechanism for such apparatus; the provision of a novel endless belt drive mechanism by which linear travel of selected flight portions of the belt may be regulated in a highly effective manner while reducing power requirements to a minimum; the provision of such a novel drive mechanism which offers a facility for belt tracking or steering control without adding to the munber of rollers about which the belt is trained; the provision of such a novel drive mechanism which does not rely on a frictional drag between the belt and an orbital driving surface for linear travel of the selected flight portions of the belt; the provision of a novel tracking or steering mechanism for endless belts; and the provision of a mechanically improved, easily assembled, maintenance free object transfer apparatus of the type referred to above and having particular utility in the field of handling non-ambulatory hospital patients.

Other objects and further scope of applicability of the present invention will become apparent to those skilled in the art from the detailed description of a preferred embodiment to follow taken in conjunction with the accompanying drawings in which like parts are designated by the same reference numeral.

BRIEF DESCRIPTION OF THE DRAWINGS

FIG. 2 is an enlarged fragmentary and cut-away plan view of the apparatus shown in FIG. 1;

FIG. 18 is a fragmentary perspective view illustrating the combined belt braking and steering mechanism of the invention;

FIGS. 19A–22A are fragmentary side elevations illustrating the respective positions of the braking roller of the present invention in relation to corresponding positions of control cams thereof;

FIGS. 19B–22B are fragmentary and somewhat schematic plan views showing the relative positions of the components shown respectively in FIGS. 19A–22A;

FIG. 23 is an enlarged fragmentary cross-section taken on line 23—23 of FIG. 18;

FIG. 24 is a cross-section taken on line 24—24 of FIG. 23;

FIG. 25 is a front elevation showing the master control unit for operation of the improved apparatus of this invention.

DETAILED DESCRIPTION OF THE PREFERRED EMBODIMENTS

Figure 1:
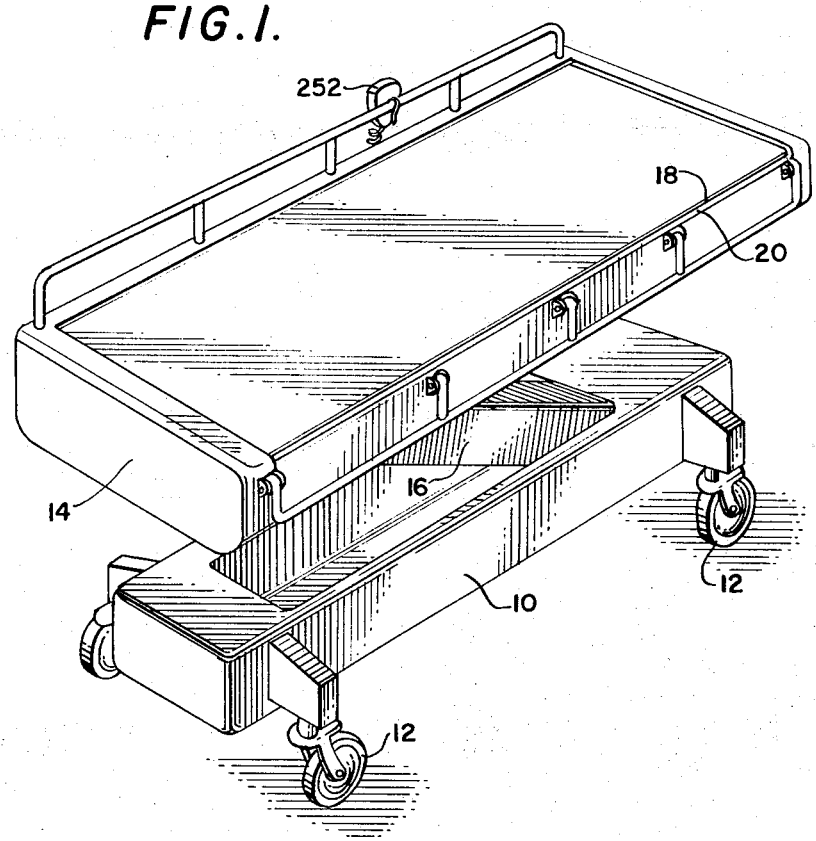
FIG. 1 is a perspective view of the object or patient handling apparatus incorporating the improvements of the present invention.

To facilitate an understanding of the basic object transfer apparatus incorporating the improvements of the present invention, reference is first made to FIGS. 1–9 of the drawings. As shown in FIG. 1, the apparatus includes a mobile base structure or chassis having a lower pedestal section 10 supported on swivel mounted caster wheels 12 and an upper transfer section 14 supported for vertical adjustability with respect to the pedestal by a lifting arm 16. A pair of laterally translatable, superposed upper and lower transfer apron assemblies 18 and 20, respectively, as well as the drive mechanism for these assemblies, are carried by the upper section 14. Hence the improvements of the present invention are primarily concerned with operating components contained in the upper section 14, the organization of the pedestal 10 and the lifting arm 16 being essentially the same as the prior art.

Figure 3:
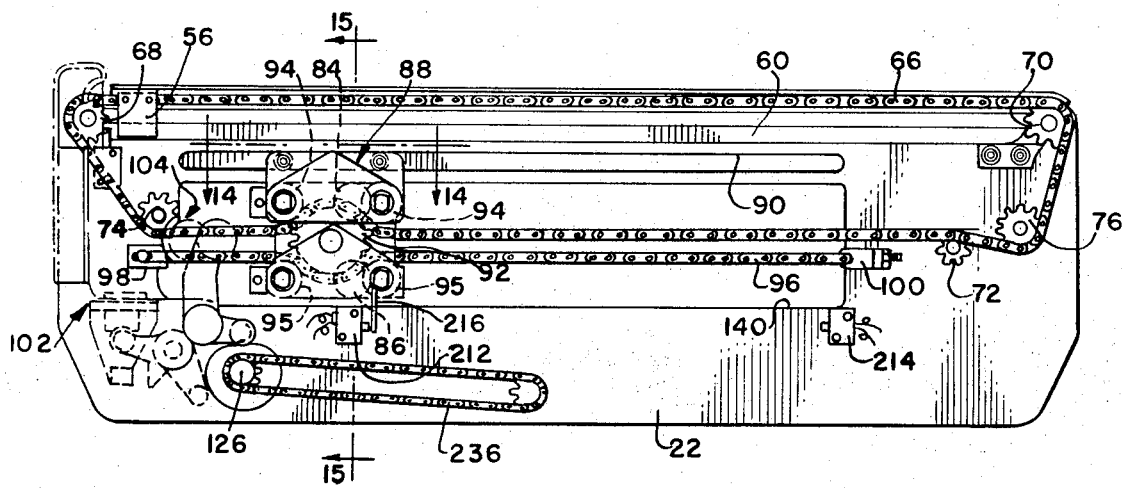
FIG. 3 is an elevation showing one of two end plates incorporated in the apparatus according to the present invention and as seen on line 3—3 of FIG. 2.

Although much of the frame structure incident to providing structural integrity in the upper section 14 has been omitted from FIGS. 2 and 3 of the drawings, the frame members on which major operating components are supported in the upper section 14 are shown in these figures to include a pair of substantially identical end plates or castings 22 connected in longitudinally spaced relation by a load carrying deck structure 24 and a back guide beam 26. The frame structure including these components among others (not shown) is enclosed by an outer shell 28 for purposes of sanitation, safety and decor. As is shown most clearly in FIGS. 5 and 7 of the drawings, the deck structure 24 in the disclosed embodiment is formed of a series of adjacent box-beam members 30 to provide a continuous upwardly facing horizontal surface for supporting the apron assemblies 18 and 20.

Figure 5:
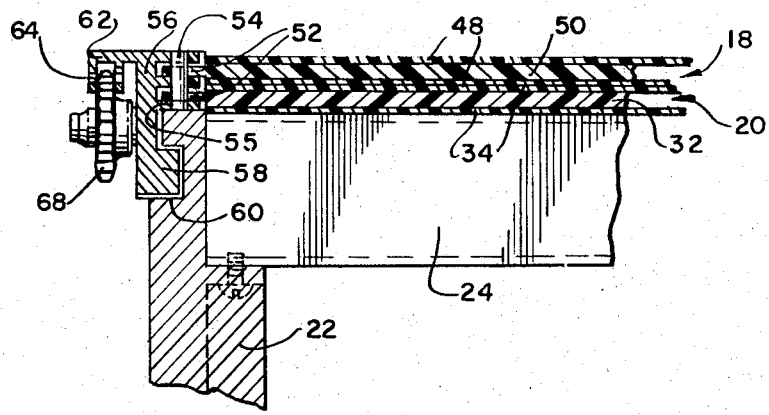
FIG. 5 is a fragmentary cross-section taken on line 5—5 of FIG. 4.
Figure 6:
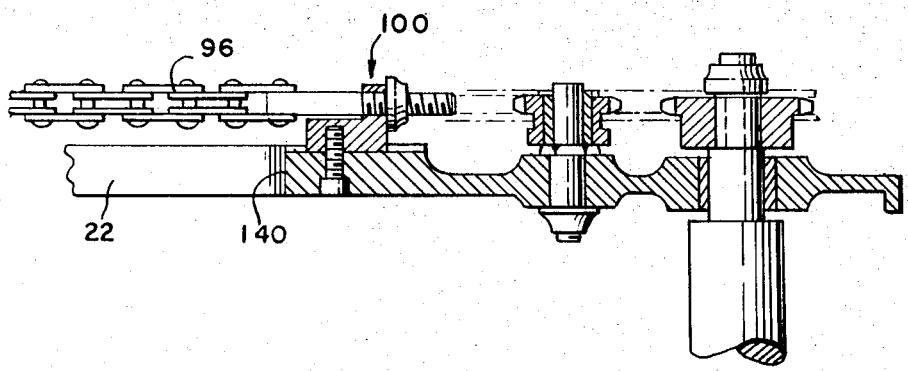
FIG. 6 is a fragmentary cross-section taken on line 6—6 of FIG. 4.
Figure 7:
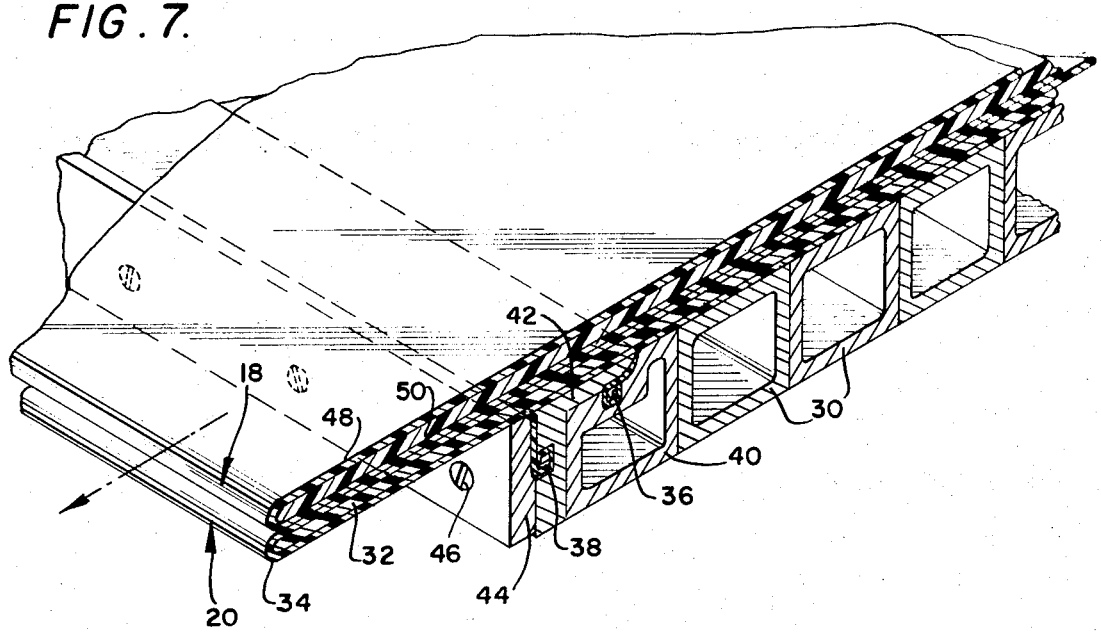
FIG. 7 is a fragmentary perspective view in partial cross-section on line 7—7 of FIG. 2.

Because the fundamental object transfer operation of the apparatus shown in the aforementioned U.S. Pat. No. 3,579,672 is retained in accordance with the present invention, the construction and function of the apron assemblies 18 and 20, in themselves, parallel quite closely corresponding units in the apparatus of that prior patent. Hence, the lower apron assembly 20, as shown in FIGS. 5 and 7, is established by a lower flexible sheet-like separator plate 32 having a thin, fabric-like apron 34 trained over the top, bottom, leading and trailing edge surface portions thereof. The material from which the apron 34 is formed is preferrably nylon reinforced teflon, the terminal ends of which are sewn or otherwise formed about welting to establish end anchoring enlargements or ribs 36 and 38. As shown most clearly in FIG. 7, the end anchorage 36 is received in an upwardly facing groove formed in a specially formed box section 40 so as to be firmly secured to the leading edge of the deck 24 by an inverted L-shaped retaining member 42. The anchorage 38 at the opposite end of the apron 34 is received in a similar groove or channel formed in the retaining member 42 and secured by an outer retaining strip 44. The strip 44 and the member 42 may be secured in place by suitable means such as screws 46 accessible from the front or leading edge of the deck 24 thereby to facilitate removal and replacement of the apron 34. The apron 34 is slidable with respect to the surfaces of the separator plate 32 such that lateral translation of the separator plate from a retracted position overlying the deck to an extended position will be accompanied by relative travel between the apron and separator in a manner that will be discussed more fully below.

The upper apron assembly 18 includes an upper apron 48 trained about an upper separator plate 50 which, for purposes of the present invention, may be considered as identical to the lower separator plate 32. As disclosed in the aforementioned U.S. patent, the separator plates function as supports for the relatively thin aprons and are formed largely of a low friction plastic material. Also, the separators 32 and 50 are preferably formed with a series of cuts (not shown) extending perpendicularly from the leading edge thereof so as to form a series of discrete fingers extending in the direction of apron assembly movement. This affords the measure of flexibility by which the combined upper and lower apron assemblies 18 and 20 will conform to the diverse contours of the human body, for example, while reclining on a flexible surface such as a bed mattress. Moreover, by forming the separator plates to be of a thickness slightly less than one-quarter inch, the combined thickness of both apron assemblies 18 and 20 can be held approximately to one-half inch or less.

As shown in FIG. 5, both separator plates 32 and 50 are provided at their inboard edge with longitudinally extending tabs 52 adapted to be secured such as by a pin 54 to spaced tabs 55 on a connecting bracket 56. The central or body portion of the bracket 56 is provided with a guide block 58 received slidably in a guide groove 60 machined or otherwise formed in the end plate 22. A bifurcated formation 62 on the bracket 56 enables direct connection of the bracket by pins 64 to a drive chain 66 of a type conventionally known as a "bicycle chain".

Figure 4:
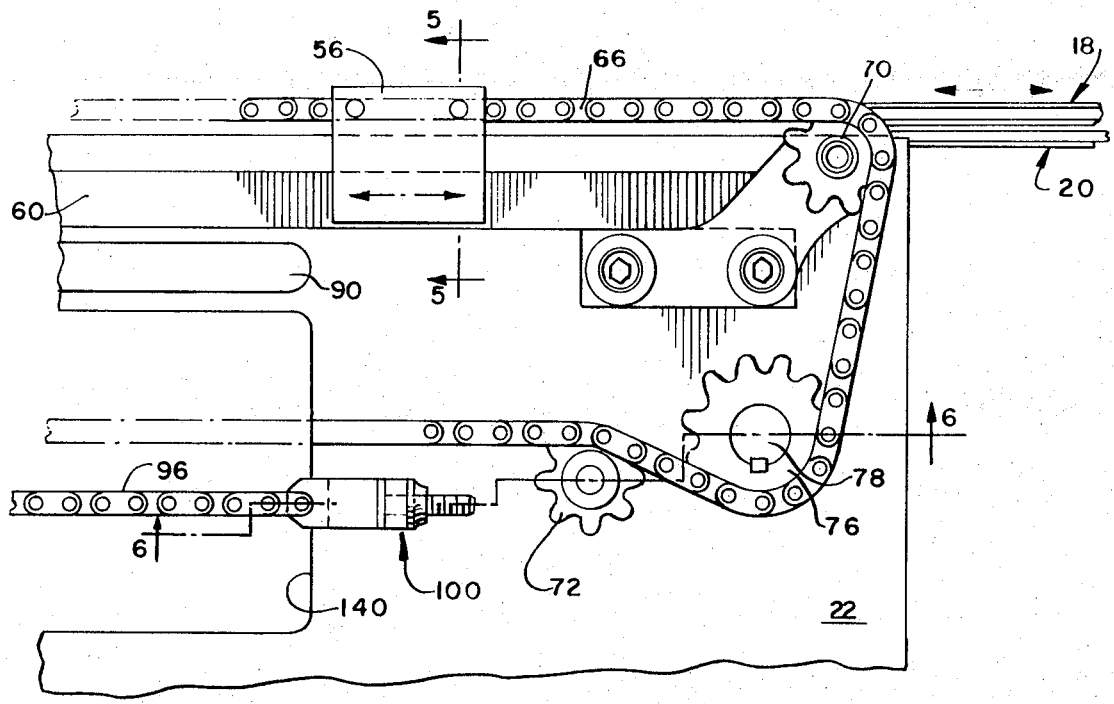
FIG. 4 is an enlarged fragmentary elevation of the end plate shown in FIG. 3.

As shown most clearly in FIGS. 2–4, the drive chain 66 is trained in endless fashion about a series of idler sprockets 68, 70, 72 and 74 and a drive sprocket 76 keyed or otherwise nonrotatably fixed to a drive shaft 78 journalled at opposite ends in the respective end plates 22 and extending the full length of the upper section 14 of the apparatus. A reversible electric motor 80 appropriately supported from the frame of the upper section 14 is coupled directly to the shaft 78 by a chain and sprocket drive 82. Thus it will be appreciated that operation of the motor 80 to rotate the shaft 78 and drive sprockets 76 in one direction will effect a lateral translation of the bracket 56, as well as the separator plates 32 and 50 connected directly to the bracket, from a retracted position in which the bracket is located at the inboard end of the deck as shown in FIG. 3 outwardly until the bracket approaches a position in proximity to the idler sprocket 70. Because of the single motor and shaft arrangement for driving the drive chains 66 at opposite ends of the machine coupled with attachment to both chains through the brackets 56 of both separator plates 32 and 50, the longitudinal parallel relation of the supports to the deck will be retained throughout total movement thereof between their retracted and extended positions.

The upper apron 48 is established by flight portions of an endless belt, the complete flight path of which will be described more fully below with reference to FIGS. 9A–9D of the drawings. In connection with the structural illustration of FIGS. 3 and 8, however, it will suffice to note that the endless belt forming the upper apron 48 is trained about a pair of moving or translatable rollers 84 and 86 journalled at opposite ends in carrieage members 88 suspended from grooved tracks 90 formed in the end plates 22. Also journalled in each of the end carriage members 88 is a pinion sprocket 92 located between upper and lower pairs of upper idling guide rolls 94 and 95, respectively. The guide rolls 94 insure engagement of a portion in the lower run of the drive chain 66 with the pinion sprocket 92. Also in engagement with the pinion sprocket 92 is a fixed length of bicycle chain 96 secured at its ends to the end plate 22 by adjustable brackets 98 and 100. The chain 96 functions with the pinion sprocket 92 in the manner of a rack and is retained in driving engagement with the pinion by the guide rolls 95 as shown most clearly in FIG. 3. Thus, rotation of the pinion due to orbital movement of the drive chain 66 by the drive sprocket 76 will bring about travelling movement of the carriage member 88 in a direction opposite to that in which the separator bracket 56 is moved and through one-half the distance through which the bracket 56 is moved. In this manner, a direct mechanical synchronization of the movement of both the separator plate brackets 56 and the carriage members 88 on opposite ends of the apparatus is brought about.

Figure 8:
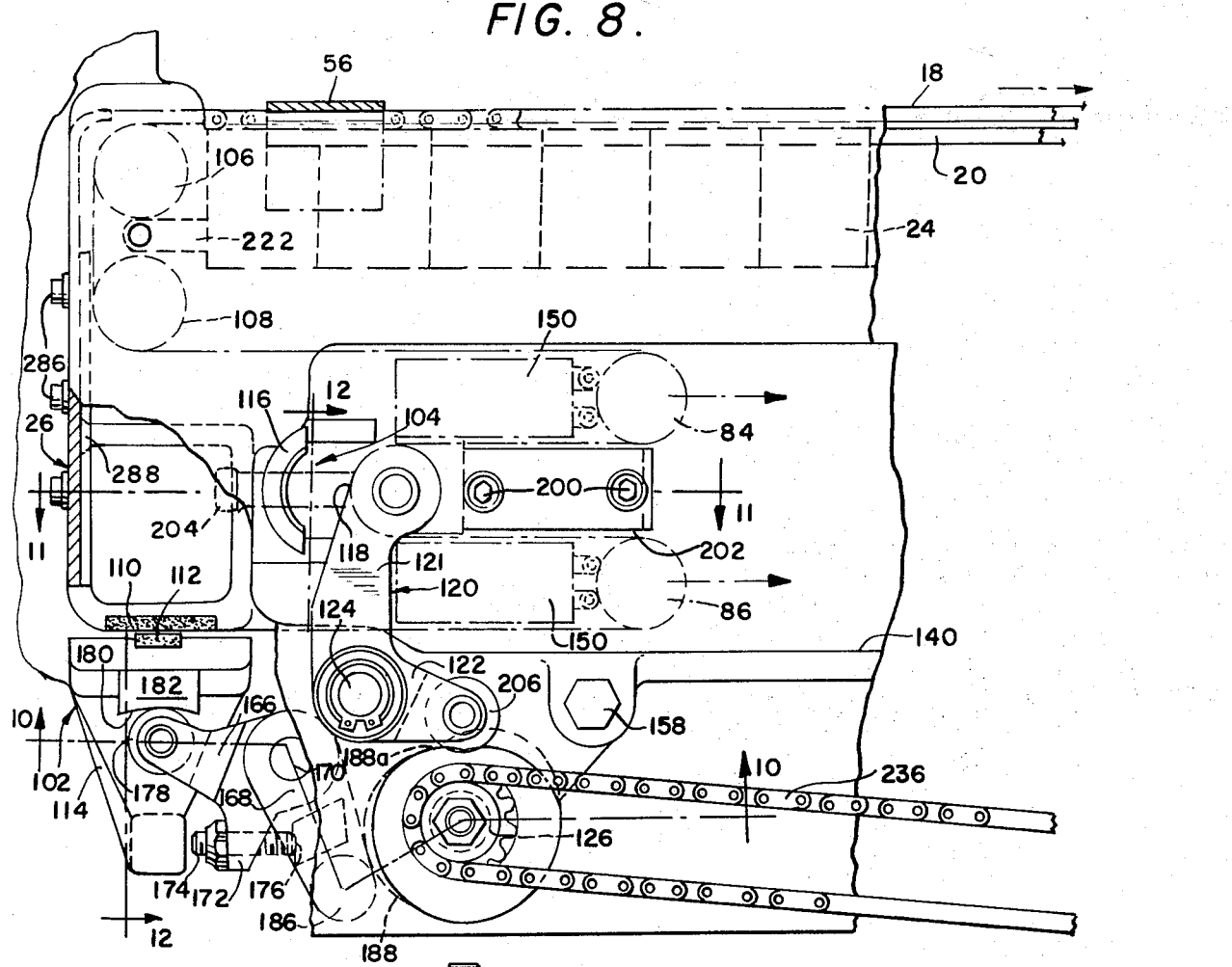
FIG. 8 is an enlarged fragmentary end elevation similar to FIG. 3 and partially cut-away.
Figure 10:
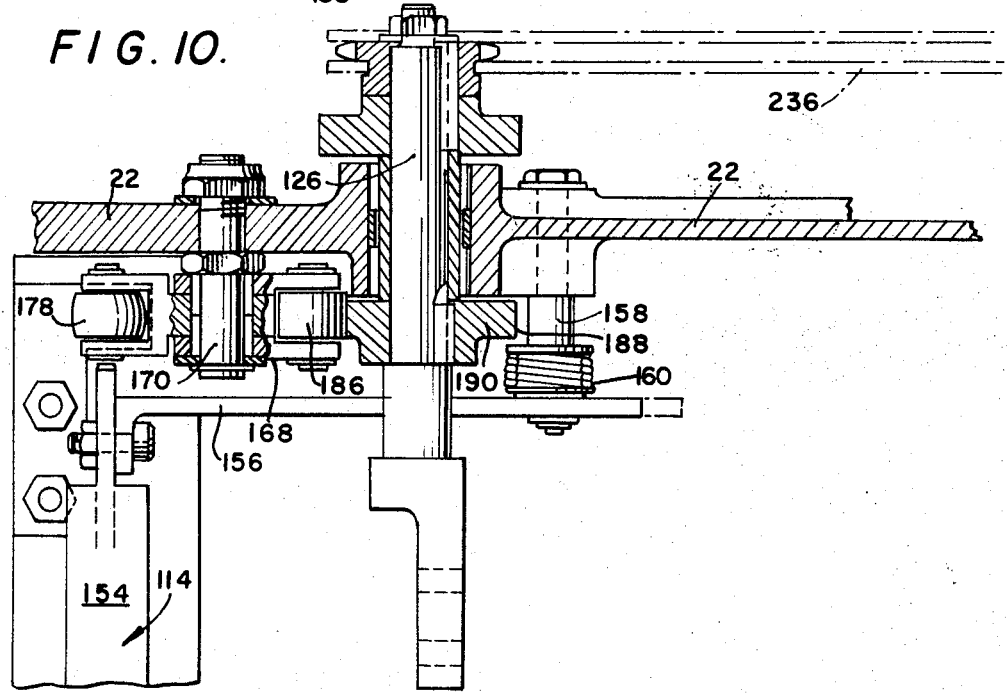
FIG. 10 is a fragmentary cross-section taken on line 10—10 of FIG. 8.

Other structural components having a direct bearing on the basic object transfer operation of the aprons 18 and 20 in accordance with the present invention are shown in FIGS. 3 and 8 to include a primary or main brake 102, a secondary or roll brake 104 and a pair of idler guide rollers 106 and 108. Although the complete structural organization and operation of the brakes 102 and 104 will be described in more detail below, an understanding of the general object transfer operation can be had by noting that the main brake 102 includes a fixed shoe or friction pad 110 secured along the bottom surface of the back guide beam 26 and a movable friction pad 112 secured along the upper surface of a retractable brake shoe beam 114. Thus it will be appreciated that a belt portion passing between the pads 110 and 112 will be held stationary with respect to the pad 110 as well as the remaining frame structure of the upper section 14 when the pad 112 is moved against the belt and the pad 110. Conversely, separation of the pads 110 and 112 will allow a belt to move freely along the bottom of the back guide beam 26.

The roll brake 104 includes an arcuate friction pad and shoe 116 secured directly to a front face portion of the back guide beam 26 and is adapted to cooperate with the cylindrical surface of a brake roller 118 rotatably supported at opposite ends by a pair of independently movable bell crank elements 120 having arms 121 and 122 and pivoted on studs 124 fixedly mounted on the end plates 22. Hence it will be appreciated that a belt portion trained about the brake roller 118 in a way to be situated between the roller and the shoe 116 may be held against movement by bringing the brake roller 118 and that portion of the belt into engagement with the fixed arcuate shoe 116. The roll brake 104 as well as the main brake 102 are operated in synchronism by a cam system to be described below and carried on a single cam shaft 126 also journalled at opposite ends in the end plates 22.

Figure 9A:
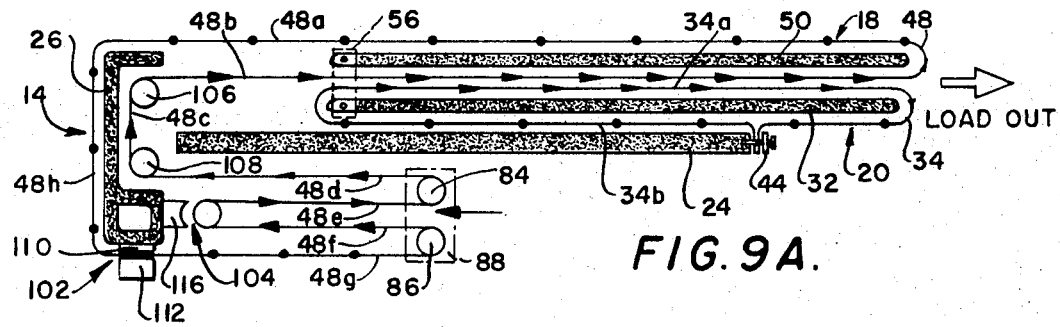
FIG. 9A—9D are schematic illustrations depicting in four phases of operation, the basic apron and belt drive components of this invention as those components would be seen in line 9—9 of FIG. 2 but at a greatly distorted scale in the interest of a clear illustration of operating principles as distinguished from particular structure.
Figure 9B:
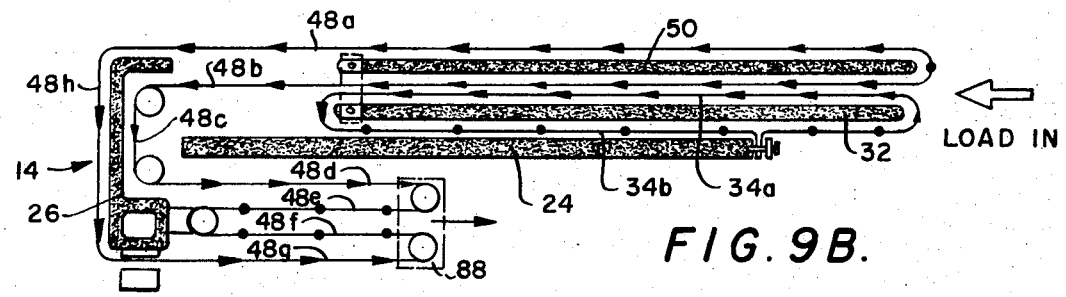
Figure 9C:
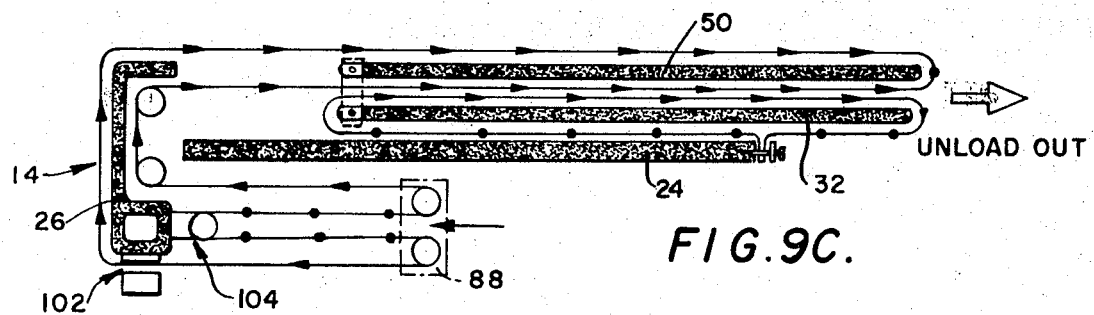

In FIGS. 9A–9B of the drawings, the components described above are shown schematically to depict the improved apparatus of the present invention in four phases of object transfer operation respectively; that is, "load out", "load in", "unload out", "unload in". Also in these figures the complete flight path of the respective belts establishing the upper apron 48 and the lower apron 34 are represented by lines provided with arrow heads to indicate direction of travel of flight portions or runs in the belts or with spaced dots on those flight portions which remain stationary during certain phases of operation. Hence, and as mentioned above, the lower apron 34 is formed as a simple loop of belt material trained about the top, bottom and edge surface portions of the lower separator plate 32 to establish in the lower apron an upper flight portion 34a and a lower flight portion 34b. Because the lower flight portion 34b is secured by the above-described anchorage including the strip 44, the lower flight portion 34b remains stationary in relation to the deck 24 and other portions of the upper section 14 of the disclosed apparatus during all four phases of operation. The upper flight portion 34a of the lower apron, however will move in the same direction as the lower separator plate 32 but at twice the linear speed thereof. Hence, in the "load out" and "unload out" phases shown respectively in FIGS. 9A and 9C and wherein the separator plate 32 is translated from an initial retracted position overlying the deck 24 to an extended positon overlying a bed or other surfce (not shown) on which the object or person to be transferred is initially reclined, the flight portion 34b of the lower apron will function to insulate the lower separator plate 32 from frictional contact with that bed or other initial surface. The upper flight portion 34a, during these phases of operation, will move outwardly in the same direction as the separator plate 32 but at twice the speed thereof as a result of the mechanics of the lower apron assembly. Conversely, during retracting movement of the separator plate 32, as during the "load in" and "unload in" phases shown in FIGS. 9B and 9D, operation of the lower apron is a mere reversal of that in the other two phases.

The length and flight path of the endless belt forming the upper apron 48 is considerably greater and more complicated than that of the lower apron 34. As can be seen readily in FIGS. 9A–9D, an uppermost flight portion 48a extends from the back guide beam 26 to the leading edge of the upper separator plate 50 and merges with a lower apron flight portion 48b extending from the leading edge of the upper separator plate to the idler guide roller 106. After a short vertical flight section 48c between the idler rollers 106 and 108, four flight portions 48d, 48e, 48f and 48g, which makeup a storage loop formation, are established by training the upper apron forming endless belt about the moving rollers 84 and 86 mounted on the carriage members 88 and about the braking roller 118. The lowermost flight portion 48g passes between the main brake shoe pads 110 and 112 and merges with a return flight 48h extending along the back surface of the back guide beam 26.

It will be recalled that because of the organization of the drive chains 66, the brackets 56 by which both separator plates 32 and 50 are connected to an upper run of the drive chain, the pinion sprockets 92 on the carriage members 88 and the interrelation of the pinion sprocket with a lower run in the drive chain 66 and the rack chain 96, movement of the separator plates 32 and 50 outwardly as during the "load out" phase depicted in FIG. 9A, will result in the rollers 84 and 86 being moved in the opposite direction or inwardly toward the brake roller 118 at a linear speed precisely one-half that at which the separator plates 32 and 50 are moved by the drive chain 66. It will be observed that because the number (four) of the flights 48d, 48e, 48f and 48g in the storage loop is twice the number (two) of flights 48a and 48b in the upper apron in the disclosed embodiment, movement of the rollers 84 and 86 in a direction opposite from and at one-half the linear speed of the separator plate 50 will provide positive variation in the total flight length of the loop formation in inverse 1:1 proportion to variation in the total length of the flight portions in the apron. In addition, operation of the main brake 102 and of the roll brake 104 are controlled in a manner to be described more fully below so that during the "load out" phase illustrated in FIG. 9A, the main brake 102 is energized to hold the flight portions 48a, 48g and 48h in a stationary condition. The deenergized condition of the roll brake 144 allows the brake roller 118 to function as an idler roller during this phase of operation. Because the upper flight portion 48a of the upper apron 48 is held in a stationary condition with respect to the upper section 14 of the apparatus and thus with respect to the bed or other surface adjacent to which the apparatus is placed, the upper flight portion 48a of the upper apron will function to isolate the upper support plate 50 from frictional contact with the object to be transferred in a manner similar to that described in connection with the lower flight portion 34b of the lower apron relative to the surface on which the object or person is initially reclining. As a result of this frictional isolation, both apron assemblies 18 and 20 will advance between the object or person and the surface on which the object or person is resting without transmission of lateral forces from the separators 32 and 50 to either that surface or the person, respectively.

To retract the object or person, now located centrally over the extended separator plates 32 and 50, operation of the drive motor 80 and drive chains 66 is reversed so that the separator plates will move inwardly toward the back guide beam 26 whereas the carriage and rollers 84 and 86 will move in an opposite outward direction. In addition to this reverse movement of the separator plates and carriage in the "load in" phase as illustrated in FIG. 9B, however, the condition of the brakes 102 and 104 is reversed so that the roll brake 104 is energized whereas the main brake 102 is deenergized. Accordingly, both upper and lower flight portions 48a and 48b of the upper apron 48 will move as a unit or at the same speed and in the same direction as the upper separator plate 50 to carry the object back onto the deck 24. Movement of the other flight portions of the belt forming the upper apron 48 in the "load in" phase is believed self-explained by reference to the arrows and dots superimposed on the line representation the belt in the drawing. In this connection, however, it will be noted that although the lower flight portion 48b of the upper apron 48 moves in the same direction as the upper flight portion 34a of the lower apron 34 it moves at only one-half the linear speed thereof, thus causing relative sliding movement of the flights 48b and 34a. Because of the low friction characteristics of the teflon sheet material from which the aprons 34 and 48 are largely formed, the load imposed by this relative sliding movement between the apron flight portions is readily accommodated. Moreover, the tensile loading on the belt forming the upper apron 48, during this phase of operation is minimal, the rollers 84 and 86 functioning primarily to take up slack in the belt. Hence the braking force required of the roll brake 104 is also minimal and serves primarily to equalize travel in the flight portions 48d and 48g. Also, any generation of unwanted static electricity during this operation is avoided by impregnating the belts forming the aprons with graphite or the like to render them electrically conductive.

Figure 9D:
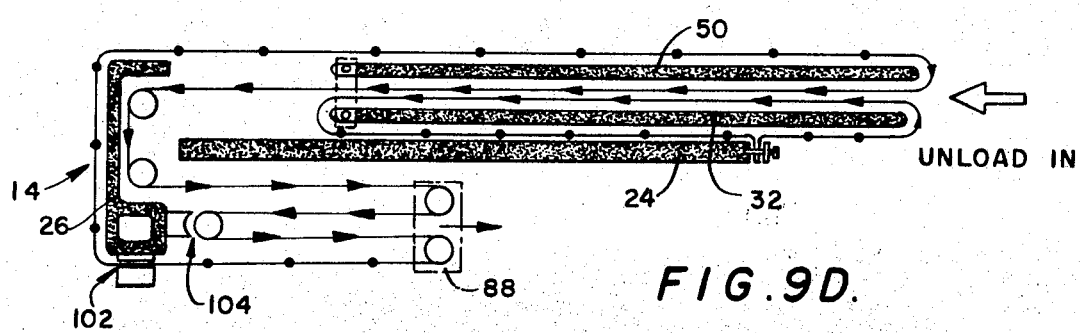
Figure 11:
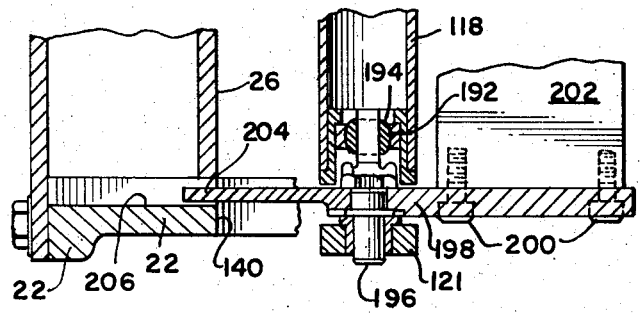
FIG. 11 is a fragmentary cross-section taken on line 11—11 of FIG. 8.
Figure 12:
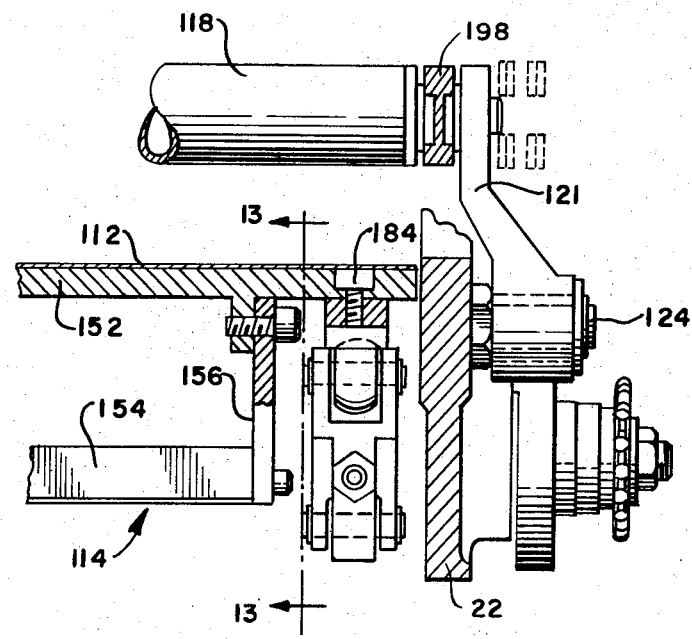
FIG. 12 is a fragmentary cross-section taken on line 12—12 of FIG. 8.
Figure 13:
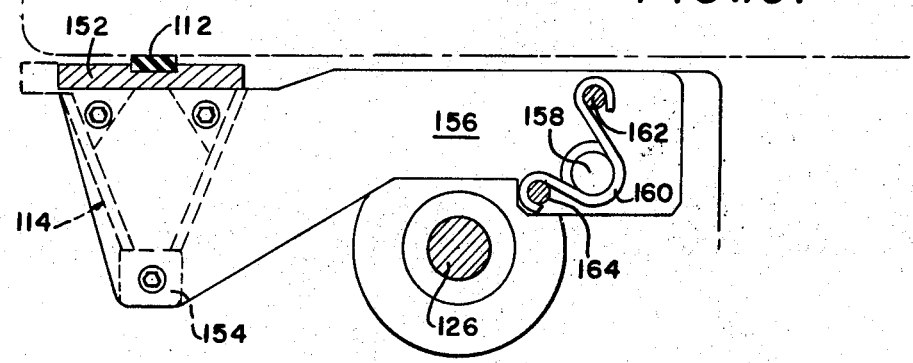
FIG. 13 is a fragmentary cross-section taken on line 13—13 of FIG. 12.
Figure 14:
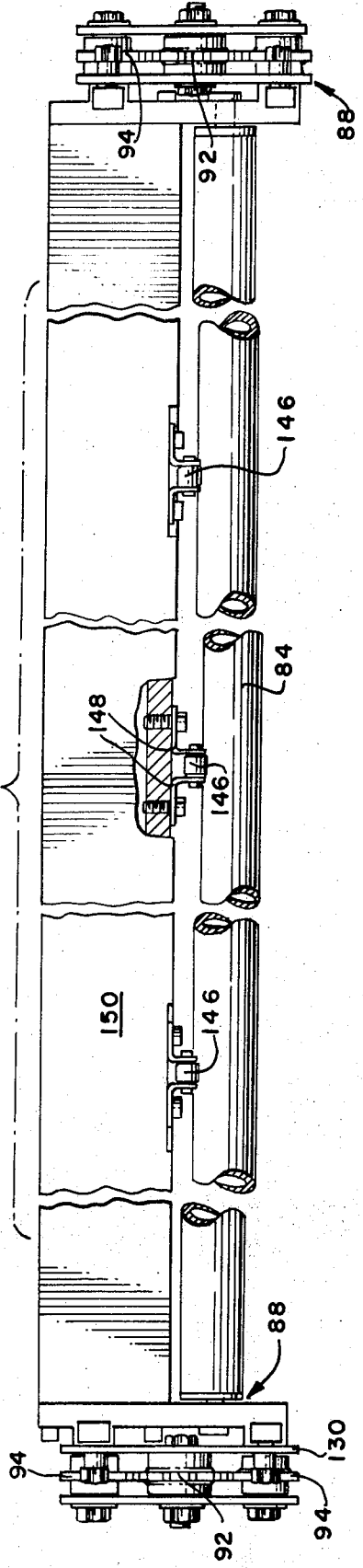
FIG. 14 is an enlarged plan view of the moving roller carrieage of the present invention as seen on line 14—14 of FIG. 3.

Operation of the aprons 34 and 48 during the "unload out" phase to transfer an object or person from a position of support on the deck 24, outwardly to a bed or other surface to which transfer is desired, involves essentially only a reversal of separator plate travel as compared with the "load in" phase depicted by FIG. 9B. Similarly, the "unload in" phase is illustrated in FIG. 9D is carried out by reversing separator plate travel from that of the "load out" phase of FIG. 9A. In light of the illustration in FIG. 9, it is believed that further description of these phases of operations is unnecessary to a full understanding of the operation of the apparatus to effect a transfer of an object or person to and from a position of support over the deck 24.

At this point, it might be noted that the structure of the separators 32 and 50, the relation of the apron flights 34a, 34b, 48a and 48b to the respective separators and the operation of these particular components to transfer an object or person in the manner described represents subject matter which in itself, is disclosed in the prior art and as such is not novel with the present invention. The point at which the present invention departs from the prior art can be depicted physically with reference to FIG. 9 as that portion of the apparatus beginning with the belt flights 48c and 48h, including the back guide beam 26, and the structure located below the flight 34b of the lower apron 34. The significance of this departure can be appreciated by noting, for example, that that portion of the endless belt forming the upper apron 48 in its flight path about the rollers 108, 84, 118 and 88 not only facilitates the use of the continuous or solid deck 24, a capability which in itself constitutes an important advance in the art, but also this flight path portion of the belt brings about a capability for positively driving the upper apron forming belt without reliance on frictional force transmission to the low friction material of the belt from an orbital drive surface, for example. In other words, the required linear travel of the several belt flight portions is developed solely as the result of tension forces developed by the upper separator 50 and the carriage supported rollers 84 and 86 in conjunction with the stationary clamping brakes 102 and 104. Other advantageous characteristics of the departure from the prior art represented by the present invention will become apparent from the more detailed description of the structure and operation of specific components to follow below.

Figure 15:
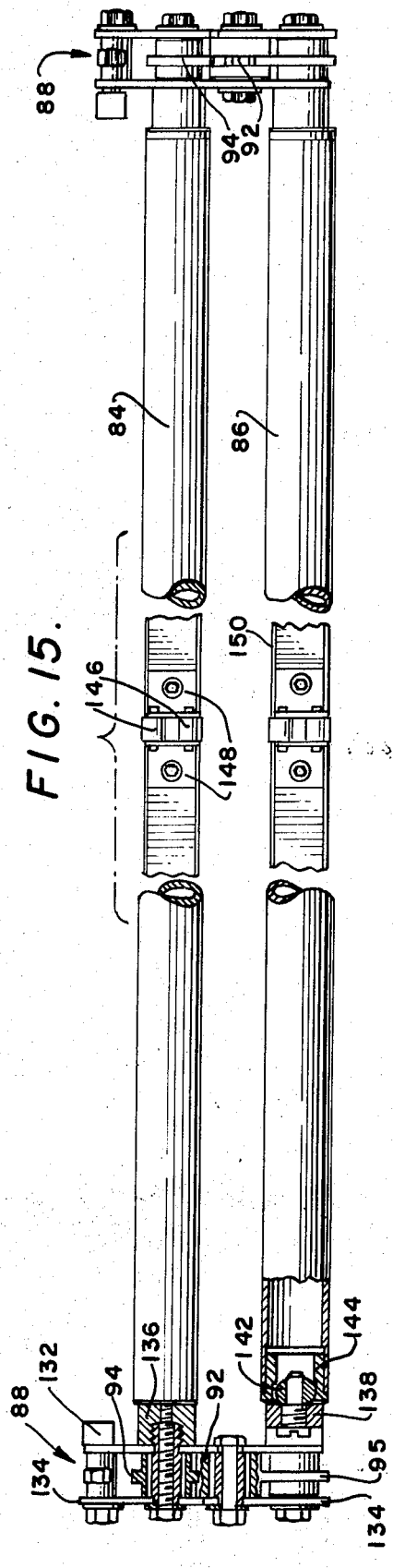
FIG. 15 is an elevation of the carriage shown in FIG. 14 as it would be seen on line 15—15 of FIG. 3.

A more complete understanding of the carriage structure which supports the moving rollers 84 and 86 may be had by reference to FIGS. 3, 8, 14 and 15 of the drawings. As shown most clearly in FIGS. 14 and 15, the carriage members 88 located at opposite ends of the moving rollers 84 and 86 are substantially identical, each including a hanger plate 130 having a pair of laterally spaced guide rollers 132 cantilevered inwardly of the plate 130, pair of bearing plates 134 spaced outwardly of the hanger plate 130 and a pair of roller mounting brackets 136 and 138 for supporting the rollers 84 and 86, respectively. The pinion sprocket 92 is appropriately journalled between the hanger plate 130 and the lower bearing plate 134 as shown in FIG. 15 as are the guide rollers 94 and 95 by which the lower run of the drive chain 66 and the rack chain 96 are constrained in driving engagement with the pinion sprocket 92 as described above with reference to FIG. 3. The guide rollers 132 are adapted to ride in the outwardly facing groove 90 in the end plates 22 which are cut out as at 140 (FIG. 3) to accommodate carriage suspension from the end plates in this manner.

The support of the four respective ends of the rollers 84 and 86 from the brackets 138 is shown in FIG. 15 to include a spherical bearing mount 142 engagable in a socket ring 144 thereby to permit unimpeded rotation of the rollers 84 and 86 about their respective axes irrespective of whether those axes are in alignment with the axis of the bearing mount 142. The importance of this bearing organization can be appreciated by reference to FIG. 14 wherein it will be noted that the rollers 84 and 86 are constrained to an arcuate configuration by a series of cradle rollers 146 journalled in brackets 148 supported on the front face of each of a pair of box beams 150 fixed at opposite ends to the brackets 136 and 138. The vertical thickness of the beams 150 relative to the rollers 84 and 86 can be seen in FIGS. 15 to be slightly less than the diameter of the rollers. The arcuate geometry of the rollers 84 and 86 facilitates a belt steering or tracking function to be described in more detail below and also insures retention of the belt forming the upper apron 48 in a uniformly taut condition over its width which parallels the length of the object transfer apparatus.

A complete understanding of the structure of the main brake 102 and its actuating mechanism may be had to reference to FIGS. 8, 10, 12, 13 and 18 of the drawings. As mentioned above with respect to FIG. 8, the fixed friction pad 110 is fixed at the lower surface of the back guide beam 26 and extends along the length of this beam between the end plates 22. The movable friction pad 112 is carried on the upper surface of a retractable brake shoe beam 114 also extending the length of the machine between the end plates 22 in generally parallel relation to the friction pad 110. As shown most clearly in FIGS. 12, 13 and 18, the brake shoe beam 114 is constructed in truss-like fashion to include a longitudinally extending upper flange member 152, on which the pad 112 is directly supported, and a lower tension strut 154. The beam or truss thus constituted is connected near its ends to a pair of plate like arms 156 pivotally supported from the end plates 22 by inwardly cantilevered studs 158. A coil spring 160 having end arms connected respectively to an end plate mounted pin 162 and a pin 164 mounted on the arm 156 serves to bias the arms 156 and thus the brake shoe beam 14 to a deenergized position wherein the pad 112 is moved downwardly away from the fixed pad 110. As can be seen most clearly in FIG. 18, the beam 114 is prestressed in such a manner that the upper surface of the flange 152 and correspondingly the friction pad 112 is constrained to an arcuate configuration in which the central portion of the pad 112 along its length approaches the fixed pad 110 more closely than at the ends. This arcuate configuration insures that upward movement of the brake beam 114 by force applying means located only at opposite ends of the beam will result in a uniform clamping pressure by the pad 112 against the belt and friction pad 110.

The actuating mechanism for the main brake 102 is shown most clearly in FIG. 8, 10, 12 and 18 of the drawings to include near each end of the brake beam 114 a pair of lever arms 166 and 168 independently pivoted on a stud 170 cantilevered inwardly from each of the end plates 22. The arm 166 is formed with an eccentric boss portion 172 tapped to receive a set screw 174 positioned to engage an abutment surface 176 carried by the arm 168. The arm 166 supports at its distal end, a roller 178 in peripheral engagement with a downwardly concave surface 180 in a bearing block 182 secured to the underside of an extension of the flange 152 of the beam 114 by suitable means such as a screw 184 as may be seen in FIG. 12 of the drawing. Thus the weight and downward bias of the arms 156 by the springs 160 will insure constant engagement of the set screw 174 with the abutment 176 so that the arms 166 and 168, though adjustable with respect to each other, operate in the manner of a single bell crank.

The distal end of the arm 168 carries a follower roller 186 to engage the peripheral surface 188 of a cam 190 keyed for rotation directly with the cam shaft 126. The profile of the cam surface 188 is shown in phantom lines in FIG. 8 of the drawings to be generally heart-shaped thereby to establish a low radius point 188a in one quadrant merging with a relatively high radius point extending in circular fashion through the remaining three quadrants about the axis of the cam shaft 126. In light of this configuration of the cam surface 188, it will be appreciated that when the follower roll 186 overlies the low radius point 188a, the brake shoe beam 114 will be biased into a downward or deenergized position. Correspondingly, when the follower 186 overlies the cam surface 188 over the three remaining quadrants of cam shaft rotation, the brake shoe 114 will be retained by the arms 166 and 188 in its upward or energized condition in which the pad 112 clamps against the upper apron forming belt and the fixed friction pad 110.

The construction of the roll brake 104 and the mechanism by which it is actuated in the performance of its braking function can be understood by reference to FIGS. 8, 11 and 12 and 18 of the drawings. As mentioned above, the brake roller 118 extends approximately the length of the apparatus between the end plates 22 and is supported at opposite ends by the bell cranks 120. As shown most clearly in FIG. 11 of the drawings, the roller 118 carries at each end a bearing socket 192 in free rotational engagement with a spherical bearing member 194 carried by a stub axle 196 in such a way that axial misalignment of the roller 118 and the stub axle will not in any way impede rotational freedom of the roller 128. The stub axle 196 is supported in cantilever fashion from the upstanding arm 121 on each of the bell cranks 120 and supports, at a point intermediate its length between the end of the roller 118 and the arm 121, a pivotal bracket 198. The bracket 198 is connected by screws 200 or other suitable means to a backup beam 202 equipped with sets of cradling rollers (not shown) similar in all respects to the cradling rollers 146 described above with respect to the moving rollers 84 and 86. In this instance, however, the cradling rollers and the beam 202 constrain the brake roller 118 to a truly linear configuration along its length and hence prevent flexing of the roller against the force of the upper apron forming belt and also against braking pressure during movement of the roller 118 toward the brake shoe 116 as shown in FIG. 18. The end of the bracket 198 opposite the end thereof connected to the beam 202 extends as a guide tab 204 slidably received in a slot or groove 206 formed in the end plate 22. The primary function of the guide tabs 204 is to support the beam 202 in a horizontal position behind the brake roller 118 in light of the pivotal connection of the brackets on the stub axle 196. As shown in FIG. 18, the lower horizontal arm 122 of the bell crank 120 carries a follower rollers 206 in position to engage the surface of one of two roll brake actuating cams 208 and 210 non-rotatably fixed or keyed at opposite ends of the cam shaft 126.

In terms of the braking function of the roll brake 104, therefore, it will readily be appreciated by those skilled in the art that by virtue of no more than a proper angular orientation of the cams 190, 208 and 210 on the shaft 126, appropriate synchronization of the main brake 102 and the roll brake 104 can be achieved in the manner described above with respect to FIGS. 9A-9D. The roll brake is energized by the slight movement of the roller 118 against the tension in the belt trained thereabout into engagement with the friction surface of the fixed shoe 116. Because of the support offered by the beam 202, no flexure of the roller 118 will occur during this braking energization even though the brake shoe extends in length over only a small portion of the central length of the roller 118. In this respect it is to be noted that in practice, the endless belt forming the upper apron 48 and trained about the roller 118 possesses a sufficient measure of slack and tensile flexibility to accommodate the braking movement of the roller 118 without unduly stressing either the belt or the components associated therewith.

In addition to functioning as a component in the roll brake 104, the brake roller 118 functions as a steering roller by which proper tracking of the upper apron forming belt is maintained throughout its flight path and particularly over the flight portions 48a and 48b during their travel relative to upper separator plate 50. The manner in which this steering or tracking function is superimposed on the braking function of the roller 118 may be understood by reference to FIGS. 19-22 of the drawings. In FIGS. 19A-22A, cam shaft 126 and the roll brake actuating cams 208 and 210 near opposite ends thereof are shown in each of four operating positions to which the shaft 126 is rotated by control means to be described below. In FIGS. 19B-22B, 22B, the effect that cam shaft positioning on the respective positioning of the brake roller 118 relative to the fixed shoe 116 and the cam shaft 126 is illustrated schematically in plan views.

With reference specifically to FIG. 19A, it will be seen that the peripheral configurations of the two cams 208 and 210 are identical and define at four mutually perpendicular radii, throw points N, S–1, B and S–2. Though identical in peripheral configuration, cams 208 and 210 are reversed or mounted on the shaft 126 in opposite directions so that the points N and B are aligned whereas the points S–1 and S–2 on the respective cams 208 and 210 are displaced by 180°. Also it might be noted that the throw of each of the cams is equal at points S–2 and B as well as maximum at these two points. The throw of each cam is smallest at the radius point S–1 whereas the throw of each cam at the radius point N is intermediate the throws at S–2 or B and S–1. Thus, in the cam shaft position illustrated in FIGS. 19A and 19B, wherein the bell crank follower roll 206 overlies the radius point N, the roller 118 is positioned away from the brake shoe 116 and in parallel relation thereto. Hence in the context of the braking function of the roller 126, a deenergized or neutral position is depicted by the relation of components in FIGS. 19A and 19B.

In FIGS. 20A and 20B of the drawings, the relationship of the cam shaft 126, roller 118 and brake shoe 116 is illustrated during a braking or energized condition of the roll brake 104. This condition is brought about by rotatably indexing the cam shaft 126 to a position in which the radius points B on both cams 208 and 210 underlie the follower roll 206 on the bell crank 120. In light of the equal and maximum throw of both cams 208 and 210 in this angular position of the shaft 126, the bell cranks 120 operate to move the roller 118 into contact with the fixed shoe 116 and also so that it is disposed in parallel relation with respect to the cam shaft 126 as well as the other rollers about which the endless belt forming the upper apron 48 is trained.

To facilitate an appreciation of the actuation of the main brake 102 relative to the roll brake 104, the outline of the main brake actuating cam peripheral surface 188 as well as that of the follower roll 186 is depicted by phantom lines in FIG. 20A. It will be recalled from the previous description of the main brake actuating mechanism that when the follower roller 186 overlies the low point 188a on the periphery 188 of the cams 190, the main brake is in a deenergized position. During all other angular positions of the cams 190, the follower roll 180 overlies an enlarged throw or radius on the cam periphery 188 to retain the main brake 102 in its energized condition. When, however, the roll brake 104 is energized as depicted by the positioning of components in FIG. 20A, the main brake 102 is deenergized as a result of the follower 186 overlying the low point of throw 188a in the cam surfaces 188.

The manner in which a belt steerage function is superimposed on the roller 118 can now be understood by reference to FIGS. 21A-22B of the drawings. As shown in FIGS. 21A and 21B, when the cam shaft 126 is rotated so that the radius point S–2 on the cam 208 underlies the follower 206 on a bell crank 120 on one end of the roller 118, whereas the radius point S–1 on the other cam 210 underlies a similar follower roll on the other bell crank associated with the other end of the roller 118, a canted or non-parallel orientation of the roller results. Moreover, it will be noted that the roller 118 is out of contact with the brake shoe 116 during this position as can be seen in FIG. 21B. Inasmuch as the upper apron forming belt is trained about the roller 118 (see FIGS. 9) the canted position of the roller 118 will effect steerage of the belt so that it will track to the right in relation to a reference direction of from left to right in FIG. 21B. A similar steering orientation of the roller 118, but in an opposite direction, is effected by the orientation of the cams 208 and 210 shown in FIGS. 22A and 22B.

In relation to the overall operation of the object transfer operation as described above with respect to FIGS. 9A–9D, the belt steering function depicted in FIGS. 21 and 22 can be operative or effective only during the "load out" and "unload in" phases of operation shown respectively in FIGS. 9A and 9D. Because the roll brake 104 is required to be energized during the "load in" and "unload out" phases of operation illustrated respectively in FIGS. 9B and 9C, which phases require the roller 118 to be held in parallel contacting relation with the fixed brake shoe 116, the roller 118 is, in effect, disabled from a steering function. Further it is to be noted that because both upper and lower flights 48a and 48b of the apron 48 move as a unit with the upper separator plate 50 during these phases, the likelihood of edgewise creeping of the apron forming endless belt during these phases is minimal if not nonexistent. This can be appreciated by comparing the relative travel of the apron flights 48a and 48b with respect to the upper separator 50 during the "load in" and "unload out" phases with the increased relative movement of those flight portions with respect to the upper separator during the "load out" and "unload in" phases. During these latter phases the steering function of the roller 118 is both available and more likely to be needed.

Figure 16:
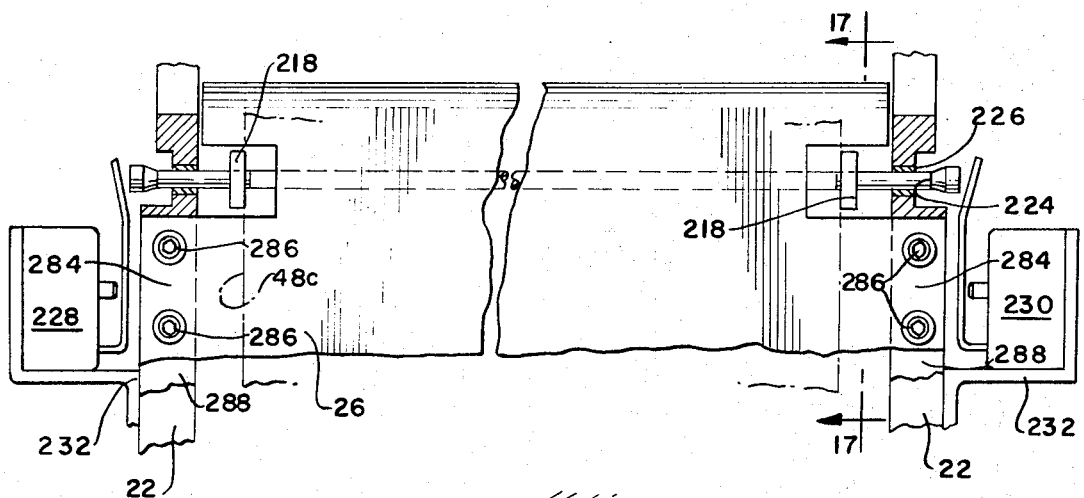
FIG. 16 is an enlarged fragmentary cross-section taken on line 16—16 of FIG. 2.
Figure 17:
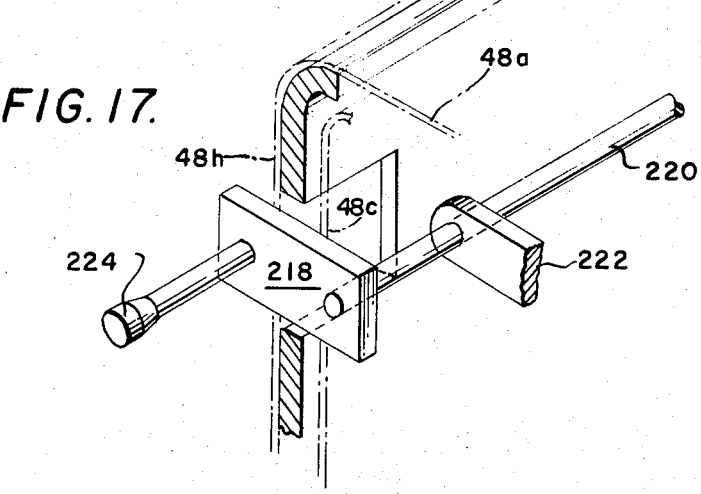
FIG. 17 is an enlarged fragmentary perspective view in partial cross-section on line 17—17 of FIG. 16 and further illustrating components shown in FIG. 16.
Figure 26:
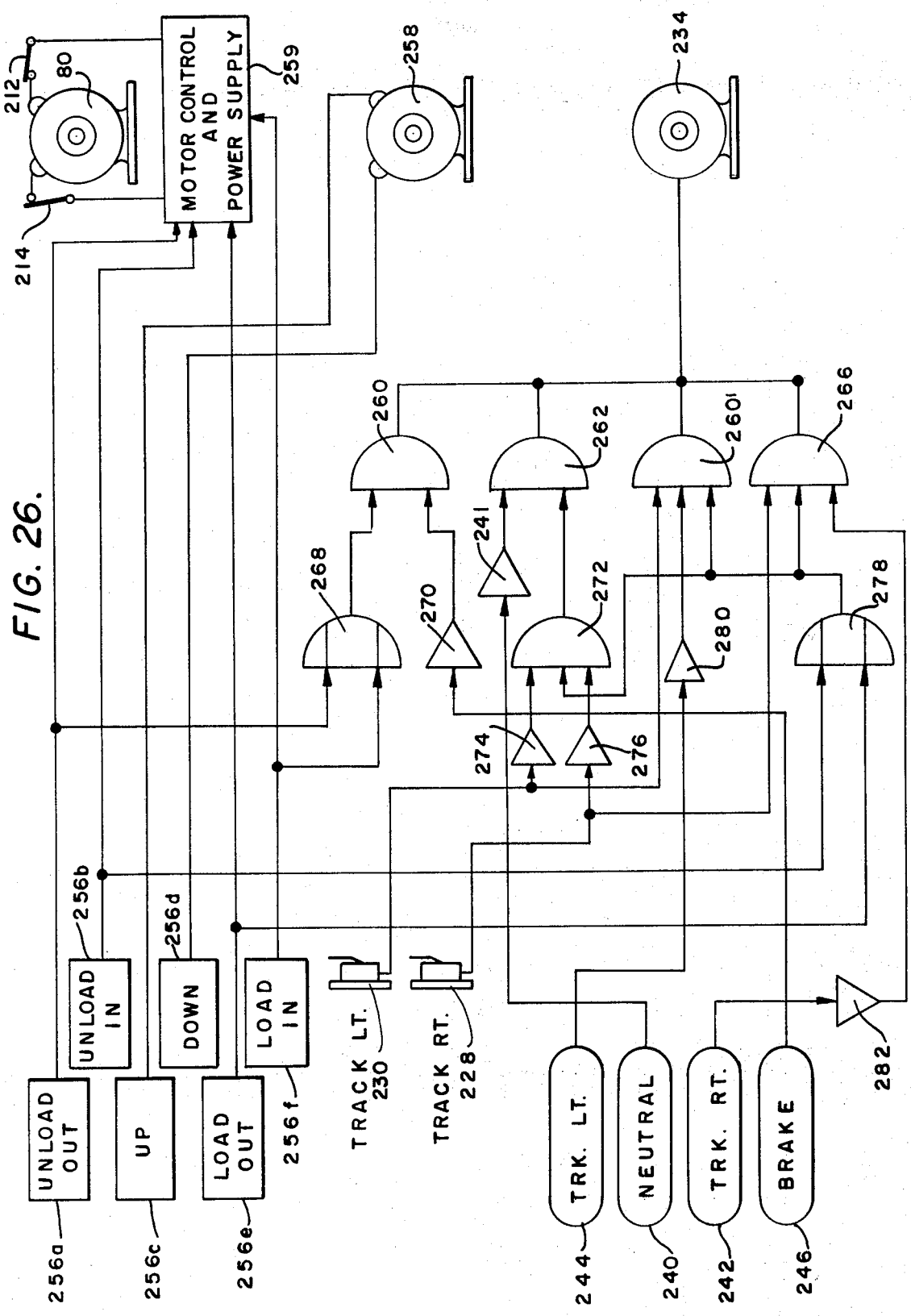
FIG. 26 is a circuit diagram illustrating the control logic by which the improved apparatus of this invention is operated.

Although a complete understanding of the operation of the apparatus described above will be had from the description to follow in conjunction with the circuit diagram of FIG. 26, reference is first made to FIGS. 2, 3, 16–18 and 23–25 wherein the physical relation of various electrical control and sensing components are shown with respect to described structural components. For example, in FIG. 3 of the drawing, a pair of limit switches 212 and 214 are shown mounted in spaced relation on at least one of the end plates 22 in a position to be tripped by a tab 216 depending from the carriage member 88 supported from that end plate. The limit switches 212 and 214 operate to terminate operation of the main drive motor 80 at opposite ends of carriage member travel and correspondingly at opposite ends of the travel of the separator plates 32 and 50 in moving between their retracted and extended positions. As shown in FIGS. 16 and 17, the position of the endless belt forming the upper apron 48, particularly the flight portion 48c thereof in relation to the longitudinal dimension of the back beam 26, is followed by a pair of guide blocks 218 supported on a slide rod 220 in a position to be engaged by the edges of the upper apron forming belt at the flight portion 48c. Thee rod 220 is supported from the back of the deck 24 by bearing tabs 222 (see also FIG. 8). Plungers 224 supported from the guide blocks 218 extend through slide bearings 226 in the end plates 22 in a position to engage left and right hand limit switches 228 and 230 respectively. The limit switches 228 and 230, as shown in FIG. 16 are supported by brackets 232 adapted to be secured by appropriate means to the end plates 22.

As shown in FIGS. 2 and 3 of the drawings, the cam shaft 126, which is journalled at opposite ends in the respective end plates 22 is adapted to be driven rotatably by a drive motor 234 and drive chain 236 mounted beneath the deck 24 and adjacent one of the end plates 22. To detect the indexed position in which the cam shaft 126 is placed by the motor 234, a shaft rotation sensing assembly shown in FIGS. 18, 23 and 24 is employed. Specifically, an insulating mount 238 of generally U-shaped configuration is supported about the shaft 126 and carries four magnetically actuated reed switches 240, 242, 244 and 246 adapted to be actuated by a pair of permanent magnets 248 and 250 carried by the shaft. As shown in FIGS. 23 and 24, the magnets 248 and 250 are both axially spaced and angularly spaced at right angles with respect to one another so that for any given 90° increment of shaft rotation, only one of the four reed switches will be actuated at one time.

In addition to the component sensing and control devices thus described, a manually operated master control unit 252 is provided; an exemplary embodiment thereof being illustrated in FIGS. 1 and 25 of the drawings. As will be seen in FIG. 25, the unit 252 is equipped with an extensible cord 254 connected electrically with control circuitry located in the pedestal 10 of the apparatus and also equipped with six push button switches 256a–b carrying legends corresponding too the operational phase effected by depression. In this context, it will be noted that four of the push buttons 256a, 256b, 256e and 256f correspond directly to the phases of operation described above with respect to FIGS. 9A–9D. The push buttons bearing the legends "up" and "down" enable manual control over the lifting beam 16 (see FIG. 1) operated by an electric motor which, though not shown in FIG. 1 of the drawings, is illustrated schematically in the circuit diagram of FIG. 26 and designated by the reference numeral 258. The motor 258 and the drive transmission thereof by which the upper portion 14 of the apparatus is elevated or lowered by the lifting beam 16 is fully disclosed in the prior art.

In light of the foregoing description, it will be appreciated that overall operation of the several components illustrated and described will be carried out by operation of the main drive motor 80, the cam shaft drive motor 234 and in some measure by the lifting motor 258, the latter being used only to position the aprons 18 and 20 at the desired elevation. As shown in FIG. 26, the push buttons 256c and 256d bearing respectively the legends "up" and "down" would operate the motor 258, which is reversible, in either of one of two directions depending on which of these buttons is depressed. Although in actual practice, the circuitry of this motor is likely to be more sophisticated than that depicted in FIG. 26, the basic operation of the motor will be apparent to one skilled in the art from the schematic showing of FIG. 26.

Similarly, the main drive motor 80 may be operated under the control of a conventional motor control and power supply circuit 259 in turn controlled by signals generated by the depression of any one of the switch buttons 256a, 256b, 256e or 256f to advance the separator plates and roller carriage members 88 in the appropriate direction to effect the operation phase indicated by the respective legends carried by these push buttons. The limit switches 212 and 214 which are depicted as normally closed and in the power supply circuit to the motor 80 in FIG. 26, may in practice be connected electrically in other parts of the overall circuit by which the motor is operated. In any event, the limit switches, being normally closed, will permit operation of the reversible drive motor 80 in either of two directions until the limit switch is opened by the carriage and the separator plates reaching their maximum limits of travel.

Operation of the main brake 102, the roll brake 104 as well as steering operation of the brake roller 118, as mentioned above, are controlled by indexing rotation of the cam shaft 126 by the motor 234. In the disclosed embodiment, the motor 234 is unidirectional and controlled by logic circuitry including four AND gates 260, 262, 264 and 266. In other words, the motor 234 will operate to rotate the cam shaft as long as any one of the four AND gates 260–264 is enabled by a specific combination of conditions of the push buttons 256, the limit switches 228 and 230 and the reed switches 240–246 which in FIG. 26 bear legends corresponding to function which will occur at the respective indexed locations of the shaft 126. Thus, the AND gate 260 will be enabled to effect operation of the drive motor only if during depression of either of the push buttons 256a or 256f to bring about respectively the "unload in" or "load in" phases of operation (both of which require energization of the roll brake 104), the reed switch 246 is opened to indicate that the cam shaft 126 is in a position other than that in which the roll brake is energized. This operation is caused by the AND gate 260 being enabled only by the combination of a signal from an OR gate 268, in turn enabled by either of the push buttons 256b or 256f, and a signal from an inverter 270 which provides an output signal only when the reed switch is not closed. Hence, if the cam shaft 126 is in a position to close thee reed switch 246, no operation of the motor 234 will occur upon depression of the push button 256b or 256f. Moreover, if the cam shaft is located at a position so that the reed switch is not closed, the motor 234 will drive the cam shaft until the reed switch 246 is closed by angular alignment of the permanent magnet 250 therewith.

The AND gate 262 will be enabled to operate the motor 234 only upon the following conditions being present: the reed switch 240 must be opened to indicate the cam shaft 126 is in a position other than that required for positioning the brake roller 118 in a neutral position (see FIGS. 19A and 19B); neither of the tracking switches 228 or 230 must be energized; and either one of the push buttons 256b or 256e must be depressed to command the "unload in" or "load out" phases of operation respectively. The enabled state of the AND gate 262 under these conditions is brought about by the combination of an inverted signal from the reed switch 240 through an inverter 241 and the signal from an AND gate 272. The AND gate 272, in turn, is enabled to pass such a signal only upon receiving signals from inverters 274 and 276, the input to which is effected by the open condition of the microswitching 228 and 230, respectively and a signal from an OR gate 278 with which the push buttons 256b and 256e are connected. Hence operation of the motor 234 will be initiated by the AND gate 262 only when one or the other of the push buttons 256b or 256e is depressed, the microswitches 228 and 230 are open and the reed switch 240 is open. Conversely, operation of the drive motor by the AND gate 262 will terminate upon a change in any of these conditions of the enumerated control components.

As previously indicated, the brake roller 118 can accomplish its steering or tracking function only when the roll brake 104 is in its deenergized condition as during the "load out" and "unload in" phases of operation. Operation of the motor 234 to position the cam shaft in a "track right" or "track left" position is effected by a control signal from the AND gates 264 and 266 respectively. In this connection, it is to be noted that the term "track left" implies a condition in the upper apron forming belt, specifically in the flight portion 48c thereof, which requires a shifting of that flight portion to the left in order to move the belt to a desired central position between the end plates 22 wherein neither of the limit switches is closed by the plungers 224 on the guide blocks 218. The condition commanding a "track left" function, therefore, is present when the flight portion 48c causes the right hand limit switch 230 to be closed. Correspondingly the "track right" limit switch 228 is physically located at the left hand end of the machine in the same directional context. Hence, the AND gate 264 will be enabled by a closure of the "track left" limit switch 230 during a depression of either of the push buttons 256b or 256e to enable the OR gate 278 in the manner described above and by signal from an inverter 280 which is enabled only when the reed switch 244 is not in its closed position. Thus only when the cam shaft is in a position such that the magnet 250 closes the reed switch 244 will the AND gate 264 be disabled assuming the presence of signals resulting from the closure of the limit switch 230 and the push buttons 256b and 256e. Operation of the motor 234 under a control signal from the AND gate 266 will be effected in a similar manner though by closure of the limit switch 228 and by the presence of signals from an inverter 282 with which the reed switch 242 is associated and from the OR gate 278.

It will be observed that because the cam shaft indexing motor 234 is unidirectional in the disclosed embodiment, the roller 118, in moving between the four respective operating positions depicted physically in FIGS. 19–22, will at times pass through other ostensibly unwanted positions. For example, in passing between the two tracking positions depicted in FIGS. 21 and 22 and depending on the direction of cam shaft rotation, the roller 118 will pass through the braking positions of FIG. 20. Although this characteristic of the disclosed apparatus might appear undesirable, it does not in any way interfere in practice with efficient operation of the apparatus. The principal reason for this is that rotation of the cam shaft 126 by the motor 234 is quite fast in relation to travel of the upper apron forming belt flights. Hence, the relatively short duration of an unwanted position of the roller 118 under these circumstances can be accommodated by providing circuitry (not shown) to interrupt operation of the motor 80 while the cam shaft motor 234 is in operation without having an adverse effect on overall operation. Also, with particular reference to the passage of the roller through the braking position, it will be recalled that the clamping force of the roll brake 104 is relatively small by comparison to operating forces imposed on the belt forming the upper apron 48. Hence, and in the event an alternative mode of operation is preferred in which both motors 80 and 234 were operated concurrently, any need for slippage of the belt through the roll brake 104 during the instant of energization caused by cam shaft positioning can be accommodated by the relatively small clamping force which allows for such slippage. This ostensible problem can also be alleviated in some measure by making the motor 234 reversible rather than unidirectional. The control circuitry that would be required for such reversible operation of the cam shaft motor 234, however, would be unduly complicated and not justified by whatever additional efficiency to be obtained thereby.

In light of the organization of the brake roller 118 and its related control components, it will be appreciated that any tendency for the belt forming the upper apron 48 to creep edgewise (from end to end of the upper chassis section 14) as a result of unpredictable and uneven load forces during operation will be offset or corrected by the steering function of the brake roller. An additional measure of belt tracking facility is provided, in accordance with the present invention, too overcome unwanted edgewise creepage of the upper apron forming belt as a result of manufacturing tolerances in the geometry of the belt. To illustrate, if the endless belt forming the upper apron is envisaged as a truly cylindrical tube, then the belt would track through its entire flight path so long as the rollers and other surfaces defining that flight path were truly parallel. If on the other hand, the belt geometry is envisaged as slightly conical, which in actual practice is more likely to be the case as a result of manufacturing tolerances, the belt would have a tendency to creep in the direction of the edge defining the smaller end of the cone, assuming the components establishing its flight path to be in true parallel relation relative to each other. To accommodate any tendency for a given belt to define a slightly conical tube rather than a true cylindrical tube, the back guide beam 26 is mounted to the end plates or castings 22 in a manner to enable the back surface thereof over which the flight path 48h is trained to be adjusted to an alignment out of parallel with the remaining rollers and surfaces over which the belt forming the upper apron 48 is trained. Hence, as shown most clearly in FIGS. 8 and 17 of the drawings, the ends of the back guide beam 26 extend as mounting tabs 284 and are secured to the back surfaces of the end plates 22 by screws 286 over one or more shims 288. By adjusting the thickness of the shims 288, it will be appreciated that the rear surface of the back guide beam 26 can be adjusted to a position out of parallel with the leading edges of the separator plates 32 and 50, for example, to accommodate a slightly conical geometry of the belt resulting from manufacturing tolerances. Moreover it will be appreciated that this adjustment can be made as each upper apron forming belt is placed on the apparatus.

Thus it will be seen that as a result of the present invention, there is provided an improved object or patient handling apparatus by which the above-mentioned objects among others not expressly mentioned, are completely fulfilled. Also it will be appreciated by those skilled in the art that numerous variations and/or modifications of the embodiment illustrated and described herein can be made without departing from the true spirit and scope of the present invention. For example, the location of the loop formation established by the flight portions 48d–48g and associated structural components under the deck 24 is important to the operation thereof in relation to other components as well as to compactness in terms of overall desired geometry of the basic apparatus and is therefore preferred. Location of the loop formation in other positions out of contact with the deck structure, however, may be desirable with apparatus designed for applications requiring a different overall design geometry. Similarly, the lower apron assembly is important not only to the basic object transfer formation of the apparatus incorporating the improvement of this invention but also it augments movement of the upper apron forming belt in a way that the load on the roll brake 104 is minimized. Yet, it is possible that in some applications where frictional drag on the surface initially supporting or to support the object to be transferred is of little or no consequence, the lower apron assembly might be omitted entirely or replaced by a simple plate-like slide means or runner capable of holding the lower flight 48b of the upper apron out of direct contact with the deck and the object supporting surface to or from which transfer is desired.

In addition, it will be apparent to those skilled in the art from the disclosed embodiment that certain components or component sub-assemblies will have application beyond the particular function they serve in the disclosed apparatus. For example, the organization of the brake roller 118 and the actuating means by which it may be positioned in either of two radially spaced parallel positions or in either of two canted or inclined positions could be incorporated and have utility in a combined steering and tensioning mechanism for endless conveyor belts. Also, the sub-assembly of the carriage members 88 and the association thereof with the drive chain 66 and rack chain 96 might be used in various belt type article or object transfer apparatus differing substantially in many respects from the particular apparatus disclosed.

It is expressly intended therefore, that the foregoing description is illustrative of a preferred embodiment only, not limiting, and that the true spirit and scope of the present invention be determined by reference to the appended claims.

I claim:

1. In an object transfer apparatus of the type having a chassis to establish a load carrying deck structure with inner and outer edges and at least one extensible apron assembly adjustable between a retracted condition overlying the deck structure and an extended condition located at least in part beyond the outer edge of the deck structure over a surface to or from which an object is to be transferred, the apron assembly being comprised of a supporting separator translatable between retracted and extended positions corresponding respectively to the retracted and extended conditions of the assembly and an apron established by flight portions of an endless belt, said flight portions extending from the inner edge of the deck structure and being trained about the top, leading outer edge and bottom surfaces of said separator, the apron assembly being operative so that the flight portion trained on the top surface of the separator may be either held stationary relative to the deck structure during translating movement of the separator relative to the object to be transferred or moved with the separator to effect lateral transfer of an object overlying the separator, movement of the separator being accompanied by a variation in the length of the flight portions of said endless belt establishing said apron, the improvement comprising: means to establish in said endless belt a flight path defining a loop formation of variable flight length out of contact with said deck structure; means for varying the flight length of said loop formation in inverse proportion to variation in length of the apron establishing flight portions of said endless belt; primary brake means operable to hold the apron flight portion trained on the top surface of the separator stationary relative to the deck structure during translating movement of the separator; and secondary brake means operable alternately with said primary brake means to insure movement of the apron with the separator to effect lateral transfer of an object overlying the separator.

2. The apparatus recited in claim 1 wherein said means to establish said loop formation comprises generally parallel belt guiding elements defining at least two linear flight portions of variable length.

3. The apparatus recited in claim 2 wherein one of said belt guiding elements is angularly adjustable to non-parallel orientation with the others of said guiding elements to enable tracking steerage of said endless belt.

4. The apparatus recited in claim 2 wherein said belt guiding elements comprise at least one rotatable guide roller supported for translating movement with respect to the others of said guiding elements.

5. The apparatus recited in claim 4 wherein energization of said primary brake means and attendant deenergization of said secondary brake means causes rotational travel of said belt about said rotatable guide roller during translating movement thereof to vary the flight length of said loop and wherein a reversal of said brake means operation causes linear travel of said two flight portions in the same direction as said movable guide roller without rotation thereof.

6. The apparatus recited in claim 2 wherein said belt guiding elements comprise a pair of radially spaced carriage mounted translatable rollers and a relatively stationary roller, said loop formation being established by two pairs of linear flight portions, each of said two pairs merging respectively about one of said pair of translatable rollers.

7. The apparatus recited in claim 6 wherein said secondary brake means comprises a fixed brake shoe and wherein said relatively stationary roller is adjustably mounted for radial movement relative to said shoe thereby to establish said relatively stationary roller as a brake roller, said endless belt in said loop formation being trained between said brake roller and said shoe whereby radial movement of said roller against said shoe arrests movement of that portion of the endless belt in contact with said shoe.

8. The apparatus recited in claim 7 wherein said brake roller is angularly adjustable with respect to the axis thereof and with respect to the axes of the others of said guiding elements to enable tracking steerage of said endless belt.

9. The apparatus recited in claim 1 comprising automatic steering means to retain said endless belt in a given track parallel to the direction of flight travel therein.

10. The apparatus recited in claim 9 comprising a single cam shaft for controlling actuation of said primary brake means, said secondary brake means and said steering means.

11. The apparatus recited in claim 2 wherein one of said belt guiding elements is a brake roller and wherein said secondary brake means comprises means supporting a fixed brake shoe in stationary relation to said deck structure and actuating means for moving said brake roller between a neutral deenergized position spaced from said fixed shoe and an energized braking position to hold a portion of said belt in said loop formation against said fixed shoe.

12. The apparatus recited in claim 11 wherein said brake roller actuating means includes steering means to position said brake roller in a canted or non-parallel orientation with respect to the others of said belt guiding elements to cause shifting of said belt transversely to the direction of flight travel therein.

13. The apparatus recited in claim 12 comprising control means for operating said steering means only when said brake roller is not in said energized braking position.

14. In an apparatus of the type recited in claim 1 wherein said deck structure is supported between a pair of end plates each in turn supporting an endless drive chain having upper and lower runs, the upper run being connected to said separator and coextensive with the translation path thereof, the improvement comprising further: means operably connecting the lower run of said drive chain to said means for varying the length of said loop formation.

15. The apparatus recited in claim 14 wherein said means to establish said loop formation comprises a plurality of belt guiding elements including a pair of radially spaced translatable rollers and a relatively stationary roller, said loop formation being established by two pairs of linear flight portions in said belt, each of said two pairs merging respectively about one of said pair of translatable rollers, carriage members supported for translating movement on said end plates, said pair of translatable rollers being supported at their ends by said carriage members, said means operably connecting the lower run of said drive chains to said means for varying the length of said loop formation, said connecting means including speed reduction means by which said carriages are moved by said lower run of said drive chains at one-half the linear speed of travel in said lower run and in a direction opposite to the direction of linear travel in said upper run of said drive chains.

16. The apparatus recited in claim 15 wherein said connecting means comprises a rotatable pinion sprocket on said carrier member, one side of said sprocket being in driving engagement with the lower run of said drive chain and a stationary rack means in driving engagement with the other side of said sprocket.

17. In an apparatus of the type recited in claim 1 wherein said deck structures is supported between a pair of end plates, the improvement comprising further: said means to establish said loop formation being located between said end plates under said deck and including guide means extending between said end plates and spaced from the inner edge of said deck structure whereby said endless belt forming said apron is trained around the inner edge of said deck structure to said loop formation.

18. The apparatus recited in claim 17 wherein said guide means extending between said end plates comprises a beam having rear and bottom surfaces to establish a return flight in said belt between said loop formation and the flight portion of said apron trained over the top of said separator.

19. The apparatus recited in claim 18 wherein said loop formation establishing means comprises a pair of radially spaced translatable rollers, carriage means for supporting said translatable rollers, said carriage means being movably supported by said end plates, and a relatively stationary roller adjustably supported by said end plates, said loop formation being established by linear flight portions extending respectively from said guide means to one of said translatable rollers about said relatively stationary roller to the other of said translatable rollers and back to the bottom surface of said beam, said secondary brake means including a fixed brake shoe mounted on the front of said beam, and adjustable means for supporting said relatively stationary roller from said end plates for movement as a brake roller against said secondary brake fixed shoe.

20. The apparatus recited in claim 19 wherein said adjustable brake roller supporting means includes independent roller end supporting elements mounted on each of said end plates and including brake roller actuating means for moving said elements to position said brake roller selectively to a braking position in parallel contacting relation to said secondary brake fixed shoe or to a neutral position in parallel spaced relation to said secondary brake fixed shoe.

21. The apparatus recited in claim 20 wherein said brake roller actuating means is additionally operative for moving said elements independently to position said brake roller in either one of two belt steering positions in which said braking roller is disposed in a canted relation with respect to said translatable guide rollers out of contact with said secondary brake fixed shoe whereby said brake roller is operative to shift said belt in a direction normal to the direction of belt flight travel.

22. The apparatus recited in claim 21 wherein said brake roller actuating means comprises a rotatable cam shaft, a pair of cams fixed for rotation with said shaft and positioned axially thereon to be spaced in correspondence with the spacing of said brake roller supporting elements from each other said supporting elements having followers to engage the periphery of said cams respectively.

23. The apparatus recited in claim 22 wherein the peripheral configuration of each of said cams is identical and defines at each of four mutually perpendicular radii, a first maximum throw point, a second intermediate throw point, a third minimum throw point and a fourth maximum throw point, said cams being reversed on said shaft so that the first and third throw points on the respective cams are aligned whereas the second and fourth throw points on the respective cams are displaced by 180°, said braking position being established by said followers being located on said first points of both cams, said neutral position by location of said followers being located on said third throw points of both cams, and said steering positions being established by location of said followers on the second and fourth throw points of said cams respectively.

24. The apparatus recited in claim 23 comprising drive means for rotatably indexing said cam shaft.

25. The apparatus recited in claim 24 comprising automatic control means for said drive means, said control means being responsive to any one of four object transfer phases of operation to control operation of said drive means to index said shaft and position a particular one of said throw points on each cam in operative relation to said brake roller supporting element followers corresponding to the flight travel in said belt loop formation required for a selected one of said object transfer phases of operation.

26. The apparatus recited in claim 25 wherein said control means comprises means for sensing the position of said belt in relation to a central tracking position and means responsive to said sensing means to effect operation of said cam shaft drive means to position said brake roller in one of said two steering positions until said belt returns to a said central tracking position.

27. The apparatus recited in claim 26 wherein said control means is disabled from response to said sensing means when said brake roller is in said braking position.

28. The apparatus recited in claim 18 wherein said primary brake means comprises a fixed friction surface on the bottom of said beam and a retractable brake shoe on the opposite side of said belt from said fixed friction surface.

29. The apparatus recited in claim 28 wherein said retractable brake shoe extends substantially the length of said beams and including actuating arm members near opposite ends thereof.

30. The apparatus recited in claim 29 wherein said retractable brake shoe is arcuate longitudinally to insure uniform braking pressure over its length under braking force application to said arm members.

31. The apparatus recited in claim 28 wherein said secondary brake means comprises a fixed show mounted on said beam and wherein said loop formation establishing means includes a belt guiding brake roller moable to hold a portion of said loop formation in braking engagement with said fixed shoe.

32. The apparatus recited in claim 31 comprises common means to actuate said primary and secondary brake means.

33. The apparatus recited in claim 32 wherein said common brake actuating means comprises a rotatable shaft supporting separate axially spaced cams to energize and deenergize said brake means respectively.

34. The apparatus recited in claim 33 comprising automatic drive means for rotatably indexing said cam shaft.

35. The apparatus recited in claim 18 including adjustable means to mount said beam on said end plates whereby the rear surface thereof may be disposed in slight non-parallel relation to other belt guiding surfaces to compensate for geometric variances in said belt.

36. The apparatus recited in claim 21 comprising means supported between said carriage members to constrain said translatable rollers in an arcuate configuration to assist the belt shifting operation of said brake roller.

37. In an apparatus of the type defined by claim 1 wherein the recited apron assembly is an upper apron assembly in which the separator thereof overlies and is connected for translating movement with a like separator in a lower apron assembly having a lower belt-like apron trained through upper and lower flights about the top, bottom and edge surfaces thereof, the lower flight of said lower apron being fixed against movement with respect to said deck structure, the improvement comprising further: means providing in said deck structure a continuous upwardly facing surface, said lower apron being supported in direct contact with said deck surface.

38. In an object transfer apparatus having a transfer apron translatable between retracted and extended positions, the apron being formed by variable length flight portions of an endless belt trained in part about a translatable support member, the combination comprising: a plurality of generally parallel guide rollers establishing a loop formation in said belt separator from said apron and having a series of linear flights double in number to the flights in said transfer apron, carriage means supporting at least two of said guide roller for movement with respect to at least one other of said guide rollers, endless drive means having a pair of spaced linear runs, means connecting said translatable member to one of said runs, and means connecting said carriage to the other of said runs, said last mentioned means including speed reduction means by which said carriage member is moved by said endless drive means in a direction to reduce the flight length of said loop formation during corresponding increases in the length of said apron flights and vice versa, said carriage member being moved at a velocity one-half the linear velocity of said support member.

39. The apparatus recited in claim 38, wherein said speed reduction means comprises a rotatable pinion or said carriage, said other run of said drive means being in driving engagement with one side of said pinion, and stationary rack means in driving engagement with the opposite side of said pinion.

* * * * *